(12) United States Patent
Munakata et al.

(10) Patent No.: US 11,220,726 B2
(45) Date of Patent: *Jan. 11, 2022

(54) SILVER ARTICLE AND METHOD FOR PRODUCING SILVER ARTICLE

(71) Applicant: MISTY COLLECTION Co., LTD., Chofu (JP)

(72) Inventors: Masami Munakata, Chofu (JP); Kohtaro Munakata, Chofu (JP)

(73) Assignee: MISTY COLLECTION Co., LTD.

(*) Notice: Subject to any disclaimer, the term of this patent is extended or adjusted under 35 U.S.C. 154(b) by 0 days.

This patent is subject to a terminal disclaimer.

(21) Appl. No.: 17/053,071

(22) PCT Filed: Jan. 31, 2020

(86) PCT No.: PCT/JP2020/003737
§ 371 (c)(1),
(2) Date: Nov. 5, 2020

(87) PCT Pub. No.: WO2020/179309
PCT Pub. Date: Sep. 10, 2020

(65) Prior Publication Data
US 2021/0115534 A1    Apr. 22, 2021

(30) Foreign Application Priority Data
Mar. 1, 2019  (JP) .............................. JP2019-037169

(51) Int. Cl.
*C22C 5/06* (2006.01)
*B24B 31/02* (2006.01)
*B24B 49/00* (2012.01)

(52) U.S. Cl.
CPC ............... *C22C 5/06* (2013.01); *B24B 31/02* (2013.01); *B24B 49/006* (2013.01)

(58) Field of Classification Search
None
See application file for complete search history.

(56) References Cited

U.S. PATENT DOCUMENTS

| 6,139,652 A * | 10/2000 | Carrano | C22C 5/06 148/430 |
| 2003/0034097 A1 * | 2/2003 | Ogasa | C22C 30/00 148/538 |
| 2015/0079422 A1 * | 3/2015 | Sunaga | C22C 5/06 428/673 |

FOREIGN PATENT DOCUMENTS

| JP | S63-62894 A | 3/1988 |
| JP | H06-279961 A | 10/1994 |

(Continued)

OTHER PUBLICATIONS

T. Theivasanthi, et al, Electrolytic Synthesis and Characterization of Silver Nanopowder, Nano Biomed. Eng. 4(2), pp. 58-65, 2012.

(Continued)

*Primary Examiner* — David Sample
*Assistant Examiner* — Elizabeth Collister
(74) *Attorney, Agent, or Firm* — Yokoi & Co., U.S.A.; Toshiyuki Yokoi

(57) ABSTRACT

Provided are a silver article formed using pure silver, which has high Vickers hardness and prohibits the occurrence of metal corrosion and the occurrence of discoloration; and its method. Disclosed are a silver article and its method, wherein the Vickers hardness is adjusted to 60 HV or higher, and when the height of the peak of 2θ=38°±0.2° by an XRD is designated as h1, and that of 2θ=44°±0.4° is designated as h2, h2/h1 is adjusted to 0.2 or greater.

6 Claims, 15 Drawing Sheets

(56) References Cited

FOREIGN PATENT DOCUMENTS

| | | |
|---|---|---|
| JP | 3196546 U | 3/2015 |
| JP | 6302780 B | 3/2018 |
| JP | 6723678 B | 7/2020 |

OTHER PUBLICATIONS

Extended European Search Report dated Jun. 17, 2021.
R Wg Wyckoff, Silver, Crystal Structures, vol. 1, 1963.
G. Mah, et al., Characterization of silver coatings deposited from a hollow cathode source, Journal of Vacuum Science and Technology, vol. 11, 1974, pp. 663-665.
Hiroshi Miyazawa, et al., Effect of Se content in high-cyanide silver plating solution on {200} crystal plane orientation ratio of electrodeposited silver layer, Materials Science Forum, vol. 783-786, 2014, pp. 1458-1463.

\* cited by examiner

SILVER ARTICLE AND METHOD FOR PRODUCING SILVER ARTICLE

TECHNICAL FIELD

The present invention relates to a silver article excluding a silver jewelry article and a method for producing the same.

More particularly, the invention relates to a silver article that has the high hardness despite using pure silver and a silver alloy having a purity of 99.9% by weight or higher and causes the development of metal allergy, the occurrence of metal corrosion, the occurrence of discoloration, and the like to a lesser extent, and to a method for producing a silver article.

BACKGROUND ART

Conventionally, it is the mainstream practice to use SV925, which is a silver alloy having a purity of about 92.5% for silver articles such as silverware.

Since this SV925 includes a predetermined amount of copper and the like as other metal components from the viewpoint of imparting the high hardness, the other metal components have been causative of the development of metal allergy, the occurrence of metal corrosion, and the occurrence of discoloration when a silver article such as silverware comes into direct contact with the skin.

Thus, for the purpose of decreasing the development of metal corrosion or the like, a silver article formed from pure silver or SV999, which is a silver alloy having a purity of 99.9% by weight or higher, has been suggested.

However, pure silver and SV999 have Vickers hardness (hereinafter, may be simply referred to as HV) and mechanical strength that are insufficient for articles, pure silver and SV999 have a problem that not only the processability is poor but it is also difficult to maintain the shape over a long time period.

Therefore, there has been suggested a method for producing an Ag alloy having the Vickers hardness equal to or higher than a predetermined value, by incorporating a very small amount of Al into SV999 having a purity of 99.9% by weight or higher, casting the mixture to obtain a casting product, subsequently melting the casting product again, and molding the molten product (for example, Patent Document 1).

More specifically, there has been suggested a method for producing an Ag alloy having a Vickers hardness of 50 or higher, the Ag alloy being formed by coating a very small amount of Al with Ag, the method including introducing 100 parts by weight of silver (Ag) having a purity of 99.9% by weight or higher and a very small amount of aluminum (Al) into a melting furnace, casting the metals into a casting product, subsequently melting the casting product again, and molding the molten product.

CITATION LIST

Patent Document

Patent Document 1: JP 6302780 B

SUMMARY OF THE INVENTION

Problem to be Solved by the Invention

However, with regard to the silver alloy disclosed in Patent Document 1 and the like, since a very small amount of Al with respect to 100 parts by weight of Ag having a purity of 99.9% by weight or higher is coated with Ag and is cast to obtain a casting product, and then the casting product is melted again and molded, there is a problem that uniform dispersion of Al becomes difficult, the production cost increases, and it is also economically disadvantageous.

Furthermore, the Vickers hardness of the Ag alloy thus obtained is 50 HV or higher. More specifically, when the mixing amount of Al is 0.05% by weight, the Vickers hardness is about 63 HV, and even when the mixing amount of Al is 0.09% by weight, the Vickers hardness is about 83 HV. Thus, the respective Vickers hardness values are still insufficient.

Moreover, since the Ag alloy thus obtained contains Al at a content of 0.05% by weight, 0.09% by weight, or the like, there is a problem that the Ag alloy causes the increase in the volume resistivity, the development of metal corrosion, and the occurrence of discoloration.

Thus, the inventors of the present invention conducted a thorough investigation, and as a result, the inventors have found that a silver article that acquires high Vickers hardness and low volume resistivity and causes the development of metal allergy, the occurrence of metal corrosion, and the occurrence of discoloration to a lesser extent, is obtained by adjusting a predetermined crystal structure without substantially incorporating a metal such as Al into pure silver or a silver alloy having an ultrahigh-purity of 99.9% by weight or higher. Thus, the inventors have completed the present invention.

That is, since silver articles are formed from pure silver or an ultrahigh-purity silver alloy, both of which have a predetermined crystal structure, it is an object of the present invention to provide a silver article, the Vickers hardness of which can be easily controlled, and which causes the development of metal allergy, the occurrence of metal corrosion, and the occurrence of discoloration to a lesser extent; and an efficient and economic method for producing such a silver article.

Means for Solving Problem

According to the present invention, there is provided a silver article formed from pure silver or a silver alloy having a purity of 99.9% by weight or higher, wherein the Vickers hardness of the silver article is adjusted to a value of 60 HV or higher, and when the height of the peak of $2\theta=38°\pm0.2°$ in an X-ray diffraction chart obtained by an XRD analysis of the silver article is designated as h1, and the height of the peak of $2\theta=44°\pm0.4°$ is designated as h2, the value of h2/h1 is adjusted to 0.2 or larger. Thus, the above-described problems could can be solved.

That is, according to the silver article of the present invention, since the silver article is formed from pure silver or a silver alloy, both of which have a predetermined crystal structure, a Vickers hardness that is high for silver articles could be easily obtained regardless of whether there is a plating layer.

Furthermore, a silver article for which the incorporation of Al or the like is substantially unnecessary, the development of metal allergy in a user, the occurrence of metal corrosion, and the occurrence of discoloration are induced to a lesser extent, and the external appearance is excellent over a long time period, can be obtained.

Furthermore, on the occasion of configuring the silver article of the present invention, it is preferable that the Vickers hardness of the silver article to be a value of 100 HV or higher, and when the height of the peak of $2\theta=38°\pm0.2°$ in an X-ray diffraction chart obtained by an XRD analysis of the silver is designated as h1, and the height of the peak of $2\theta=44°\pm0.4°$ is designated as h2, the value of h2/h1 is adjusted to 1.0 or higher.

By configuring the silver article as such, for example, in a case in which the silver article is derived from a pressing-treated and further plating-treated silver base metal and has been subjected to a predetermined barrel treatment or the like, the silver article could have very high Vickers hardness.

Therefore, the silver article thus obtained can be suitably used, and while the development of metal allergy in a user and the occurrence of discoloration are suppressed, the external appearance of the silver can be maintained over a longer time period.

Furthermore, on the occasion of configuring the silver article of the present invention, it is preferable that a silver-plating layer formed from pure silver or a silver alloy having a purity of 99.9% by weight or higher is provided on the silver article.

By configuring the silver article as such, in a silver article having a silver-plating layer, the crystal structure of the silver-plating layer is mainly changed, and even higher Vickers hardness can be obtained.

Furthermore, since silver plating penetrates into the surface unevenness on the surface of the silver article, when surface polishing is performed thereafter, a silver article having even higher glossiness and smoothness can be obtained.

Furthermore, on the occasion of configuring the silver article of the present invention, when the Vickers hardness of the silver article is designated as HV, and the half-value width of the peak of $2\theta=44°\pm0.4°$ in an X-ray diffraction chart obtained by an XRD analysis of the silver article is designated as W2, it is preferable that the value of HV×W2 is adjusted to a value of 18 or greater.

By configuring the silver article as such, the crystal structure of the silver article becomes more suitable, and the Vickers hardness of the silver article can be controlled more easily and accurately.

Furthermore, on the occasion of configuring the silver article of the present invention, when the Vickers hardness of the silver article is designated as HV, the half-value width of the peak of $2\theta=38°\pm0.2°$ in an X-ray diffraction chart obtained by an XRD analysis of the silver article is designated as W1, and the half-value width of the peak of $2\theta=44°\pm0.4°$ is designated as W2, it is preferable that the value of HV×(W1/W2) is adjusted to 48 or greater.

By configuring the silver article as such, the crystal structure of the silver article becomes more suitable, and the Vickers hardness of the silver article could be controlled more easily and accurately.

Furthermore, on the occasion of configuring the silver article of the present invention, it is preferable that the volume resistivity is adjusted to a value of 2 μ.Ohm·cm or less.

By configuring the silver article as such, the conductivity of the silver article after processing can be further increased, and the silver article as the whole of various conductive articles or as a part of the various conductive articles could exhibit satisfactory conductivity properties and satisfactory antistatic properties.

Furthermore, on the occasion of configuring the silver article of the present invention, it is preferable that the silver article is any one of an electrode member, a heat transfer article, a circuit member, a solder alternative material, a medical instrument, a reflective material, an accessory, a decoration, silver clay, and silverware.

That is, since the silver article of the present invention is a silver article having a predetermined crystal structure, hardenability of the silver article could be easily controlled, and in addition, an electrode member, a circuit member, or the like, in which the development of metal allergy, the occurrence of discoloration, and the occurrence of metal corrosion are induced to a lesser extent while excellent processability is maintained after processing, could be obtained.

Furthermore, another embodiment of the present invention is a method for producing a silver article formed from pure silver or a silver alloy having a purity of higher than 99.9% by weight, the method including the following steps (1) and (2):

(1) a step of preparing a silver article having a predetermined shape; and (2) a step of subjecting the silver article having a predetermined shape to a surface treatment with a magnetic barrel, thereby adjusting the Vickers hardness of the silver article having a predetermined shape to 60 HV or higher, and when the height of the peak of $2\theta=38°\pm0.2°$ in an X-ray diffraction chart obtained by an XRD analysis of the silver article is designated as h1, and the height of the peak of $2\theta=44°\pm0.4°$ is designated as h2, adjusting the value of h2/h1 to 0.2 or greater.

That is, according to the method for producing a silver article of the present invention, since the silver article is formed from pure silver or a silver alloy, both of which have a predetermined crystal structure, for example, even when the silver article is a silver article that is derived from a pressing-treated and plating-treated silver base metal and has been subjected to a predetermined barrel treatment or the like, the high Vickers hardness could be easily obtained.

Then, a silver article which causes the development of metal allergy in the wearer and the occurrence of discoloration to a lesser extent and has excellent external appearance over a long time period, can be produced economically and efficiently.

MODE(S) FOR CARRYING OUT THE INVENTION

First Embodiment

Figure 1A:
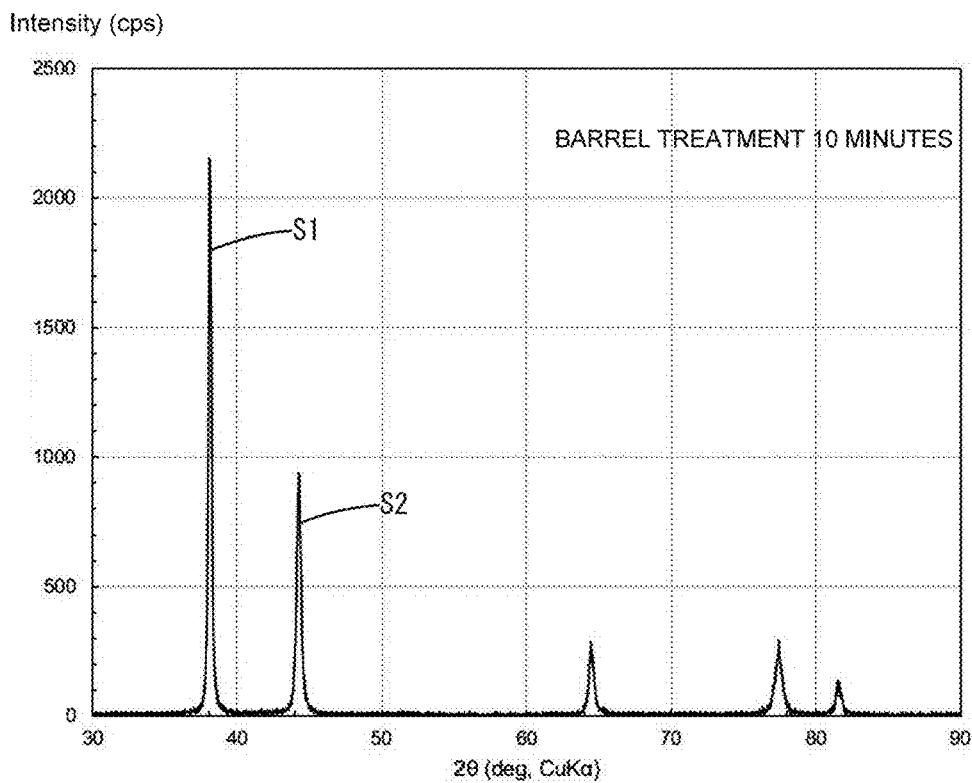
FIG. 1A is an X-ray diffraction chart obtained by an XRD analysis of a silver article (corresponding to Example 1)
Figure 1B:
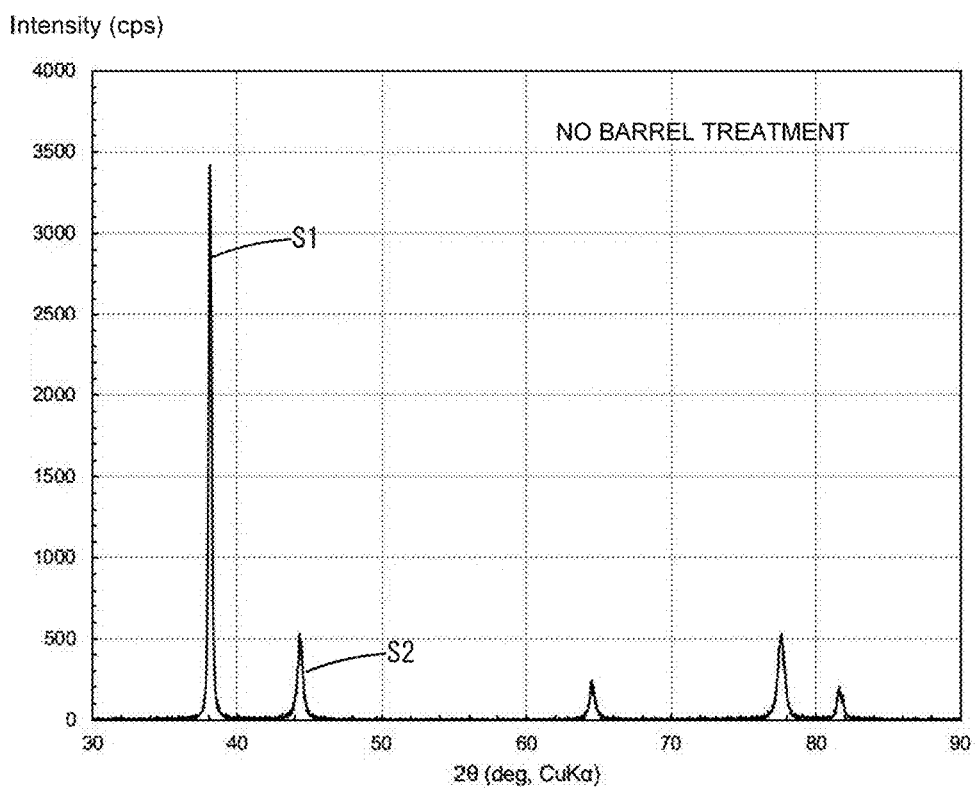
FIG. 1B is an X-ray diffraction chart obtained by an XRD analysis before a barrel treatment of a silver article (corresponding to Comparative Example 1)
Figure 2:
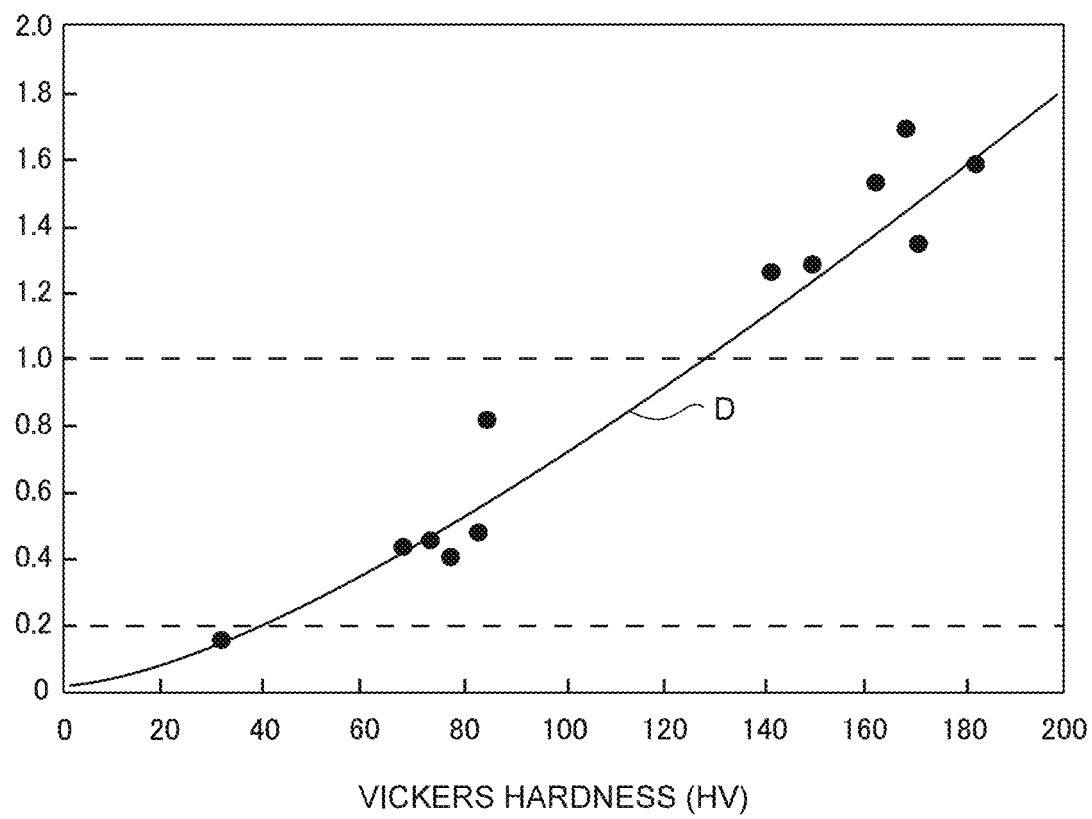
FIG. 2 is a diagram showing the relationship between the Vickers hardness (initial value) of a silver article and the ratio of (h2/h1) of the heights of predetermined peaks (h1 and h2) in an X-ray diffraction chart obtained by an XRD analysis.

A first embodiment is a silver article formed from pure silver or a silver alloy having a purity of 99.9% by weight or higher, wherein the Vickers hardness of the silver article is adjusted to 60 HV or higher, and as shown in FIGS. 1A and 1B, when the height of the peak (S1) of 2θ=38°±0.2° in an X-ray diffraction chart obtained by an XRD analysis of the silver article is designated as h1, and the height of the peak (S2) of 2θ=44°±0.4° is designated as h2, as shown in FIG. 2, the value of h2/h1 is adjusted to 0.2 or greater.

Meanwhile, FIG. 1A is an X-ray diffraction chart obtained by an XRD analysis based on Example 1, and FIG. 1B shows an X-ray diffraction chart obtained by an XRD analysis based on Comparative Example 1.

Furthermore, FIG. 2 is a diagram showing the relationship between the Vickers hardness (initial value) of a silver article and the ratio (h2/h1) of the heights of predetermined peaks (h1 and h2) in an X-ray diffraction chart obtained by an XRD analysis.

1. Purity

The silver article of the first embodiment is formed from pure silver or a silver alloy having a purity of 99.9% by weight or higher.

That is, in a case in which voltage impression or the like is carried out, since the occurrence of metal corrosion and the occurrence of discoloration are induced to a lesser extent, the silver article contains 99.9% by weight or more of silver, which means extremely high purity.

Incidentally, in the following description, pure silver implies that with regard to elements other than silver element, for example, the mass fraction measured by a glow discharge mass analyzer or the like is not above 0.001% by weight.

Therefore, the purity of silver has a value within the range of 99.9% to 100% by weight, more preferably a value within the range of 99.93% to 100% by weight, and even more preferably a value within the range of 99.98% to 100% by weight.

Furthermore, it is preferable that in a case in which the silver article is formed from the above-mentioned silver alloy, the residual components other than silver includes gold (Au), platinum (Pt), tin (Sn), or the like.

However, conventionally, in the case of such very high-purity silver, the value of the Vickers hardness is significantly small, and there are problems such as insufficient processability and highly limited use applications. Thus, there has been no example in which such very high-purity silver was used in actual cases.

Furthermore, the purity of silver and the amount of trace components included in a silver alloy having a purity of 99.9% by weight or higher can be carried out using an element analysis method, for example, an X-ray fluorescence spectroscopy (XPS), an atomic absorption spectroscopy (AAS), or an ICP emission spectroscopy.

2. Shape

Furthermore, the shape, configuration, and the like of the silver article of the first embodiment are not particularly limited; however, for example, the silver article is preferably any one of an electrode member, a circuit member, a heat transfer article, a reflective material, a medical instrument, an accessory, a decoration, silver clay, and the like (excluding a silver jewelry article).

The reason for this is because in the case of silver articles having these predetermined shapes, an effect that the development of metal allergy, the occurrence of metal corrosion, and the occurrence of discoloration are induced to a lesser extent can be further enjoyed.

In addition, in the case of silver articles having these predetermined shapes, hardenability can be easily controlled, and while excellent processability is maintained after processing, the development of metal allergy, the occurrence of metal corrosion, and the occurrence of discoloration can be further reduced.

More specifically, an electrode member (including a silver material for electrode members) includes at least one of bumps of a semiconductor device, lead frames of a semiconductor device, wire bonds of a semiconductor device, electrodes (including auxiliary electrodes) of a liquid crystal display device or an organic electroluminescent (EL) device, internal wiring of a semiconductor device, a connector terminal, a spring terminal, and the like.

Figure 13A:
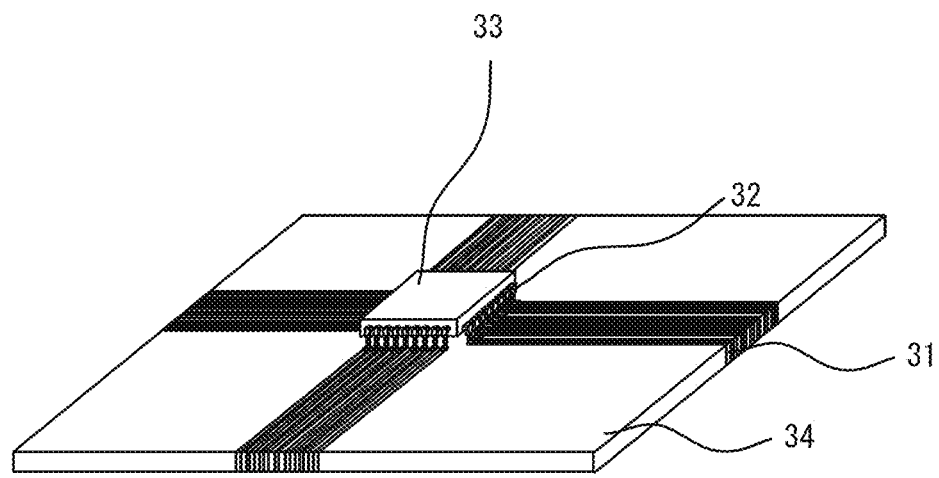
FIGS. 13A and 13B are diagrams showing an example to explain a use of a silver article after processing.

That is, in FIG. 13A, shown as an example in order to explain a use of a silver article, it is preferable that a lead frame 32 of a semiconductor integrated circuit 33 and a lead 31 of a tape automated bonding (TAB) tape 34 are configured as a silver article.

Furthermore, a circuit member includes at least one of the electrical wiring on a ceramic circuit substrate, the electrical wiring on an epoxy resin circuit substrate, the electrical wiring on a phenolic resin circuit substrate, the electrical wiring on a flexible circuit substrate, and the like.

Figure 13B:
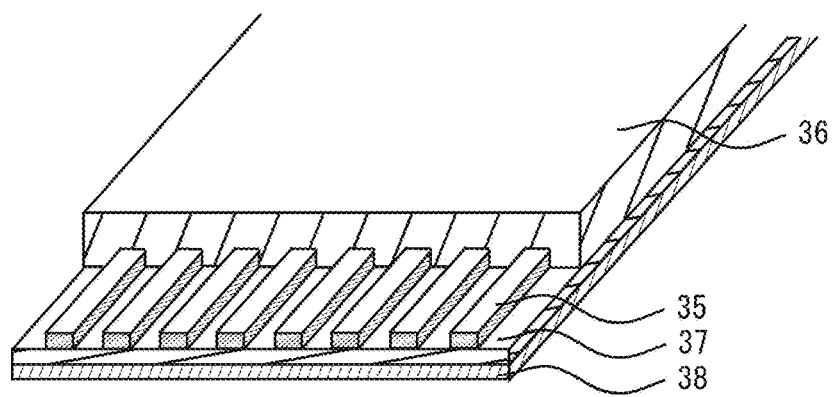

That is, in FIG. 13B, shown as an example in order to explain a use of a silver article, it is also preferable that a conductor 35 covered with both a substrate 37 and an insulating protection portion 36 is configured as a silver article.

Furthermore, a heat transfer article includes at least one of heat transfer materials contained respectively in a cooling material for a semiconductor device, a cooling material for a heating element electrically connected to a flexible circuit substrate, a tape-shaped cooling member, a variant cooling member, and the like.

Furthermore, a substitute material for solder, which is a substitute material for lead-containing solder, includes at least one of lead-free solder, a conductive material having Ag—Cu, a conductive material having Ag—Cu—Sn, and a conductive material having Ag—Cu—Zn—Sn.

Furthermore, a medical instrument includes at least one of a pair of surgical tweezers, a scalpel, a pair of scissors, a pair of forceps, a robotic hand, a bolt or a metal fitting for temporarily fixing bones, a dental filling, a covering, and the like.

Moreover, a reflective material or an accessory include a wristwatch, a buckle, a tie pin, a pair of cufflinks, a pair of glasses, a nail art material, a reflective member that is laminated to a portion of the particle surface of the reflective particles in a retroreflective sheet having a predetermined shape, and the like.

Furthermore, an accessory includes at least one of an emblem, a decorative chain, a mirror, a figurine, and the like, and also includes an object made by sintering silver clay.

Moreover, silverware includes at least one of a plate, a bowl, a cup, a teacup, a knife, a fork, a spoon, a butter knife, a muddler, a bottle opener, a pair of tongs, and the like.

3. Vickers Hardness (1) Initial Value

Regarding the silver article of the first embodiment, the Vickers hardness (initial value) after a barrel treatment is adjusted to a value of 60 HV or higher.

The reason for this is that when the value of such Vickers hardness is below 60 HV, the silver article may be easily deformed by pressure from an external source, or the durability of the resulting article may also become insufficient.

Meanwhile, as the Vickers hardness is higher, it is preferable from the viewpoint of durability; however, in a case in which the Vickers hardness is excessively high, it may not be preferable from the viewpoints of processability and handleability.

Therefore, it is preferable that the Vickers hardness after a barrel treatment of the silver article is adjusted to a value within the range of 70 to 200 HV, and it is more preferable that such Vickers hardness is adjusted to a value within the range of 80 to 180 HV.

Here, with reference to FIG. 3A, the changes in the Vickers hardness (initial value) in a silver article that was subjected to neither a plating treatment nor a pressing treatment in a case in which the processing time (0, 5, 10, 30, 40, or 60 minutes) by a barrel treatment for the silver article was changed, will be explained.

Figure 3A:
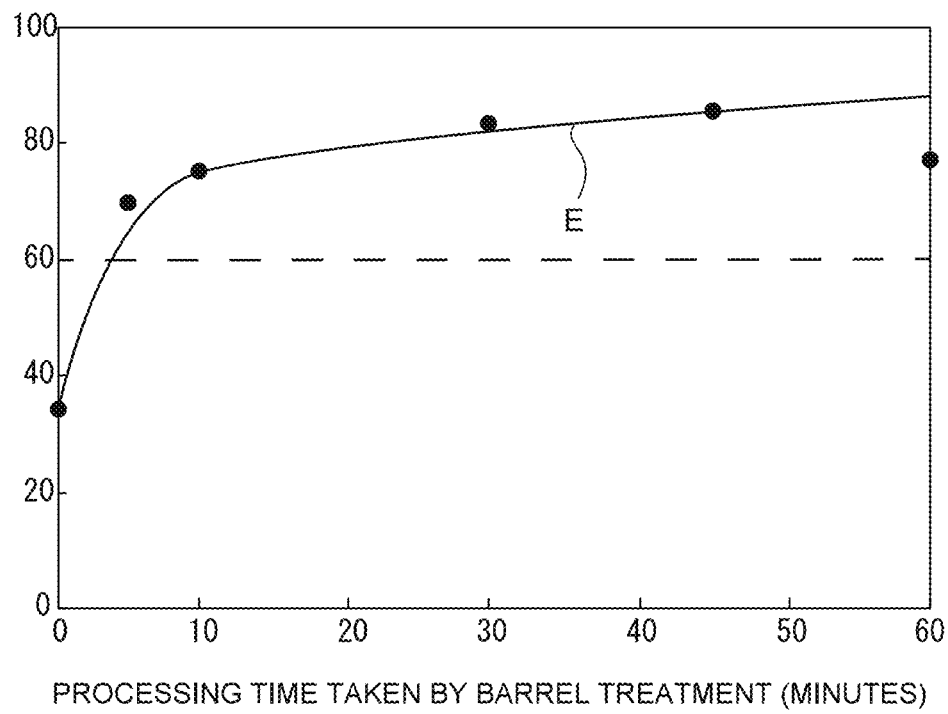
FIGS. 3A and 3B are diagrams showing the changes in the Vickers hardness (initial value) of a silver article and the changes in the Vickers hardness (after aging) of the silver article in a case in which the processing time taken by a barrel treatment for a silver article that had not been subjected to a plating treatment and a pressing treatment was changed.

More specifically, FIG. 3A employs and shows the processing time by a barrel treatment on the axis of abscissa, and employs and shows the Vickers hardness (initial value) after a barrel treatment of a silver article that was subjected to neither a plating treatment nor a pressing treatment, on the axis of ordinate.

Then, after considering from the characteristic curve in FIG. 3A, it is understood that the processing time taken by a barrel treatment is regulated, and a suitable Vickers hardness (initial value), that is, a value of 60 HV or higher, can be obtained.

Furthermore, as will be described below, when a metal coating treatment (hereinafter, may be referred to as a plating treatment) is applied to a silver article that has been subjected to a barrel treatment, the Vickers hardness can be further increased.

Figure 9A:
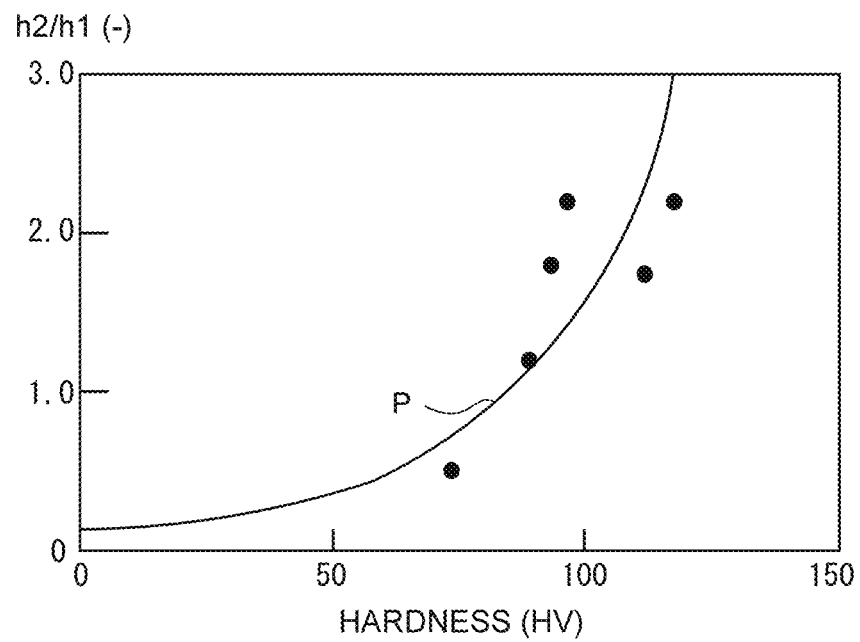
FIG. 9A is a diagram showing the relationship between the Vickers hardness (initial value) of a silver article that had been subjected to a barrel treatment and then to a plating treatment, and the ratio (h2/h1) of the heights of predetermined peaks (h1 and h2) in an X-ray diffraction chart obtained by an XRD analysis.
Figure 9B:
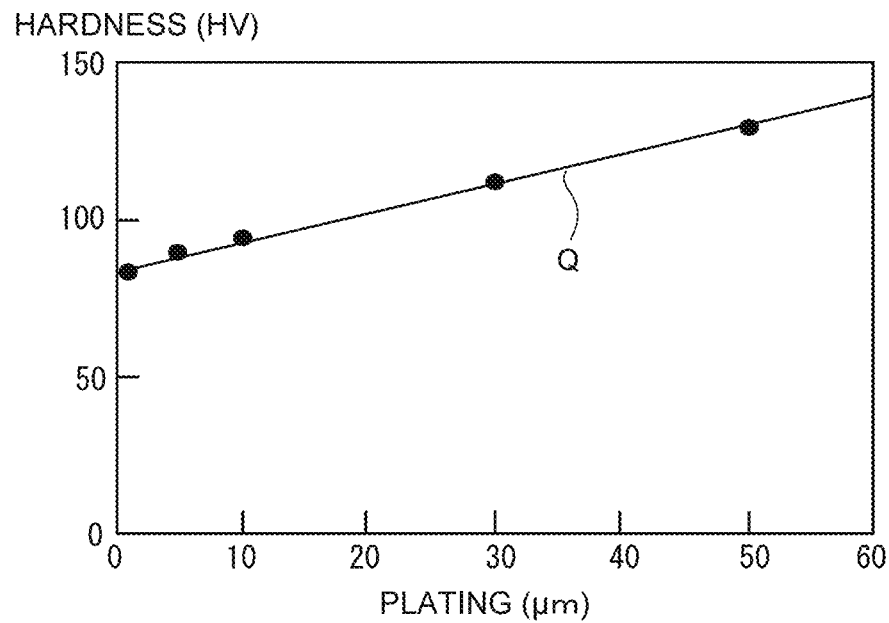
FIG. 9B is a diagram showing the relationship between the thickness of the plating treatment and the value of the Vickers hardness (initial value)

Therefore, as shown in FIG. 9B, for a silver article that has been subjected only to a barrel treatment, the Vickers hardness (initial value) per unit thickness of the plating treatment can be adjusted high to a value within the range of 0.8 to 1.2 HV. For example, it is understood that in a case in which a plating treatment with a thickness of 30 μm is applied, a value of 100 HV or higher can be obtained.

This phenomenon is speculated that as the plating undergoes crystal growth after the fashion of the surface state of the silver article that has been subjected to a barrel treatment, the crystal orientation increases, and the Vickers hardness (initial value) becomes high without applying a barrel treatment again to the plating surface.

Incidentally, as will be described below, when a silver article that has been subjected to a barrel treatment is subjected to a plating treatment and a pressing treatment, the Vickers hardness (initial value) of the silver article after a barrel treatment can be adjusted to even a higher value.

Figure 4A:
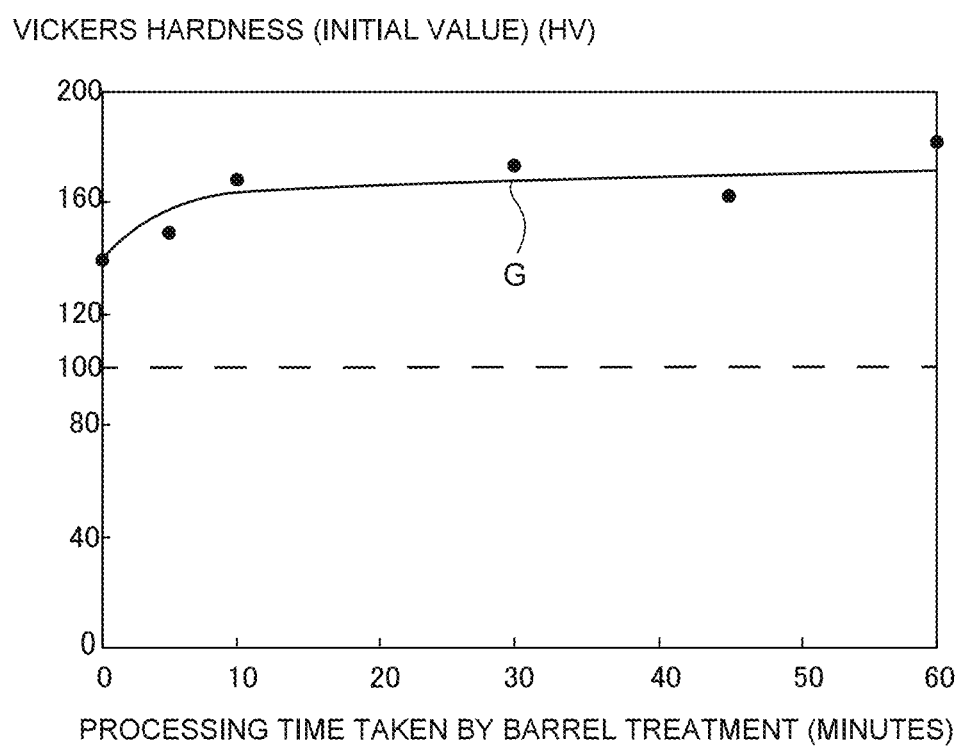
FIGS. 4A and 4B are diagrams showing the changes in the Vickers hardness (initial value) of a silver article and the changes in the Vickers hardness (after aging) of the silver article in a case in which the processing time taken by a barrel treatment for a silver article that had been subjected to a plating treatment and a pressing treatment was changed.

Therefore, as shown in FIG. 4A, from that tendency, it is understood that in the case of a silver article that has been subjected to a plating treatment and a pressing treatment, the Vickers hardness (initial value) after a barrel treatment can be adjusted to a value of 140 HV or higher. Therefore, it is more preferable that the Vickers hardness (initial value) after a barrel treatment of the silver article is adjusted to a value within the range of 150 to 200 HV, and even more preferably to a value within the range of 160 to 180 HV.

Incidentally, with regard to a silver article that has been subjected to a plating treatment or a pressing treatment, in a case in which Vickers hardness after a barrel treatment is mentioned, it means the Vickers hardness obtained in a case in which a plating treatment or a pressing treatment is carried out for the silver article that has been subjected to a barrel treatment.

(2) After Aging (80° C., 48 Hours)

Furthermore, it is preferable that after a barrel treatment, the silver article of the first embodiment is placed for 48 hours at 80° C. to be subjected to an aging treatment, and then the Vickers hardness is adjusted to a value of 60 HV or higher.

The reason for this is that by a return effect and the like of the silver article, when the value of such Vickers hardness is below 60 HV, the silver article may be easily deformed by pressure from an external source, or the durability of the resulting silver article may also become insufficient.

Therefore, after a barrel treatment of the silver article, it is more preferable that the Vickers hardness after performing an aging treatment at 80° C. for 48 hours is adjusted to a value within the range of 70 to 200 HV, and it is more preferable that the Vickers hardness is adjusted to a value within the range of 80 to 180 HV.

Here, with reference to FIG. 3B, the changes in the Vickers hardness (after aging) in a silver article that has been subjected to neither a plating treatment nor a pressing treatment in a case in which the processing time (0, 5, 10, 30, 40, or 60 minutes) by a barrel treatment for the silver article was changed, will be explained.

Figure 3B:
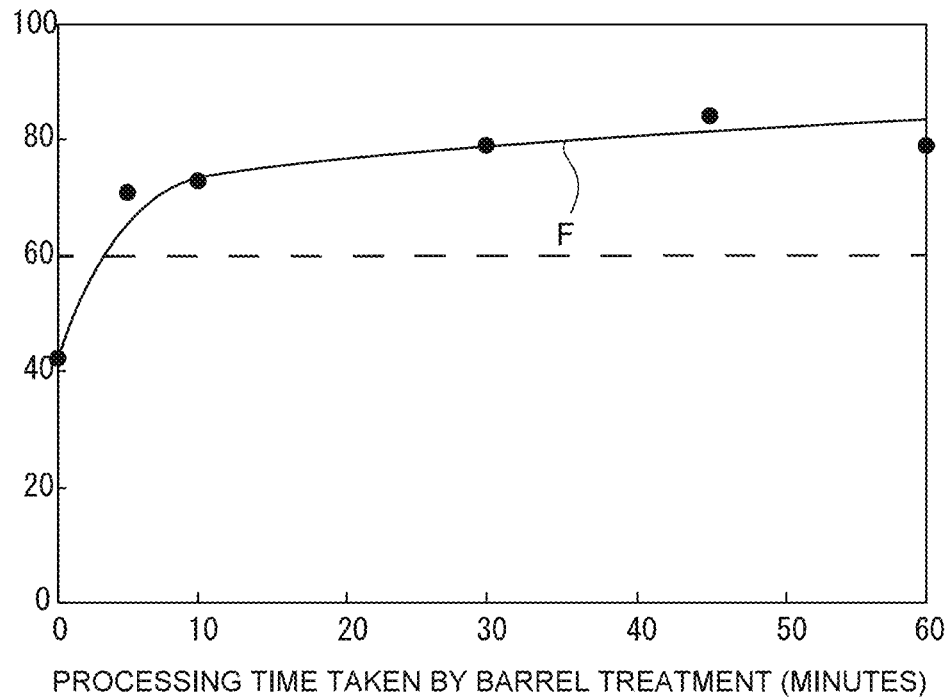

More specifically, FIG. 3B employs and shows the processing time taken by a barrel treatment on the axis of abscissa, and employs and shows the Vickers hardness (after aging) after a barrel treatment of a silver article subjected to neither a plating treatment nor a pressing treatment, on the axis of ordinate.

Then, after considering from the characteristic curve in FIG. 3B, it is understood that when the processing time taken by a barrel treatment is regulated, a suitable Vickers hardness (after aging), that is, a value of at least 60 HV or higher, could be obtained.

Figure 4B:
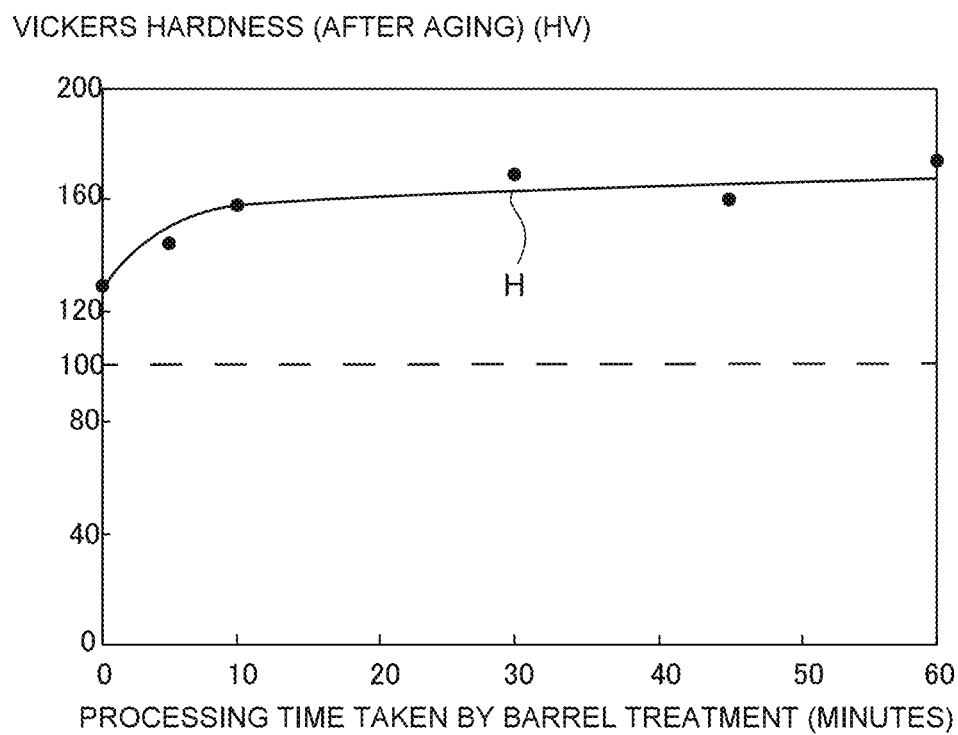

Meanwhile, as will be described below, as shown in FIG. 4B, it has been made clear that in the case of a silver article that has been subjected to a plating treatment and a pressing treatment, the Vickers hardness (not only in the initial stage but also after aging) after a barrel treatment acquires significantly high values.

Therefore, from that tendency, in the case of a silver article that has been subjected to a plating treatment and a pressing treatment, it can be said that it is more preferable that the Vickers hardness (after aging) after a barrel treatment is adjusted to a value within the range of 120 to 200 HV, and it is even more preferable that the Vickers hardness is adjusted to a value within the range of 140 to 180 HV.

(3) Annealing

Furthermore, after a barrel treatment, it is preferable that the Vickers hardness of a silver article that has been annealed by heating for 5 minutes at 100° C. is adjusted to a value of 60 HV or higher.

The reason for this is that when a silver article that has been once hardened is softened by heating, and such hardness has a value of below 60 HV, the durability of the resulting silver article may become insufficient.

That is, generally, metals have a property of becoming hard when subjected to processing (plastic deformation) such as drawing; however, metals are softened by heating, and the hardness may be decreased.

Therefore, after a barrel treatment, it is more preferable that the Vickers hardness of a silver article that has annealed for 10 minutes at 100° C. is adjusted to a value of 60 HV or higher, and it is even more preferable that the Vickers hardness of a silver article that has been annealed for 30 minutes at 100° C. is adjusted to a value of 60 HV or higher.

Figure 14:
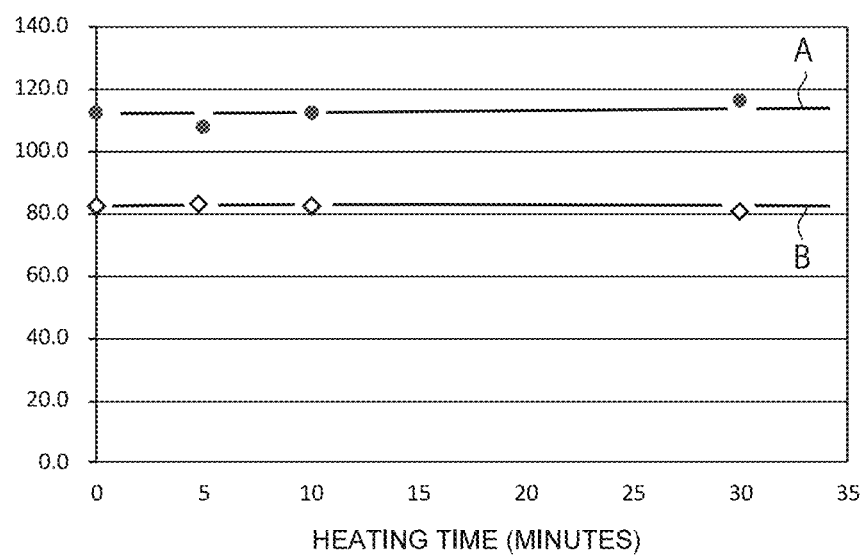
FIG. 14 is a diagram showing the changes in the Vickers hardness with respect to the time taken by heating at 100° C., for a silver article that had been subjected to a barrel treatment and a silver article that had been subjected to a plating treatment and a barrel treatment.

Here, in FIG. 14, with the annealing time at 100° C. being plotted on the axis of abscissa, and the Vickers hardness of a silver article being plotted on the axis of ordinate, the changes in the Vickers hardness obtained when a silver article (A) that had been subjected to a barrel treatment and a plating treatment and a silver article (B) that had been subjected to a barrel treatment were heated for a predetermined time at 100° C., are shown.

From these results, it is understood that even when the silver articles are heated for 30 minutes or longer at 100° C., the Vickers hardness of A and B are adjusted to a value of 60 HV or higher. Furthermore, particularly regarding A, it is understood that even when the silver article is heated for 30 minutes or longer at 100° C., the Vickers hardness can be maintained at a value of 100 HV or higher.

4. X-Ray Diffraction Chart Obtained by XRD Analysis (1) h2/h1

The silver article of the first embodiment is such that, as shown in FIG. 2, when the height of the peak of $2\theta=38°\pm0.2°$ in an X-ray diffraction chart obtained by an XRD analysis is designated as h1, and the height of the peak of $2\theta=44°\pm0.4°$ is designated as h2, the value of h2/h1 is adjusted to 0.2 or greater.

The reason for this is that in a case in which the value of the ratio (h2/h1) of the heights of such peaks (h1 and h2) is adjusted to 0.2 or greater, a suitable crystal structure of the silver article can be obtained regardless of having a plating layer, and high Vickers hardness is easily obtained.

Furthermore, it is because when high Vickers hardness is obtained, it is easier to maintain the Vickers hardness for a long time period.

Therefore, it is more preferable that the value of h2/h1 is adjusted to 0.5 or greater, and even more preferably to 1.0 or greater.

Furthermore, in order to adjust the value of the ratio (h2/h1) of the heights of peaks to 1.0 or greater, it is preferable that the silver article is subjected not only to the above-mentioned barrel treatment but also to a plating treatment and a pressing treatment in advance.

As shown in FIG. 9A, with regard to a silver article that has been subjected to a barrel treatment is further subjected to a plating treatment to a thickness of 30 μm, it is preferable that when the height of the peak (S1) of $2\theta=38°\pm0.2°$ in an X-ray diffraction chart obtained by an XRD analysis is designated as h1, and the height of the peak (S2) of $2\theta=44°\pm0.4°$ is designated as h2, the value of h2/h1 is adjusted to 1.1 or greater.

The reason for this is that with regard to a silver article that has been subjected to a plating treatment and a pressing treatment in addition to a barrel treatment, in a case in which the value of the ratio (h2/h1) of the heights of such peaks is adjusted to below 1.1, the crystal structure of the silver article may not be made more suitable.

Therefore, it is because it may be difficult to obtain higher Vickers hardness, or it may be difficult to maintain the higher Vickers hardness for a long time period.

Therefore, it is more preferable that the value of h2/h1 is adjusted to 1.3 or greater, and it is even more preferable that the value of h2/h1 is adjusted to 1.5 or greater.

That is, as shown in the upper part of the characteristic curve of FIG. 2, when these treatments are carried out, the value of h2/h1 increases significantly, the crystal structure of the silver article becomes more suitable, and the Vickers hardness can be controlled to have an even higher value.

Therefore, with regard to a silver article that has been subjected to a barrel treatment, even in a case in which the silver article is subjected to a plating treatment to a thickness of 30 μm and then is annealed for 5 minutes at 100° C., it is preferable that the value of h2/h1 is adjusted to 1.1 or greater.

The reason for this is that similarly to the Vickers hardness, a silver article that has been once hardened is softened by heating, and the durability of the resulting silver article is prevented from becoming insufficient.

That is, it is more preferable that the value of h2/h1 of a silver article that has been annealed for 10 minutes at 100° C. after a barrel treatment is adjusted to 1.3 or greater, and it is even more preferable that the value is adjusted to 1.5 or greater.

Figure 15:
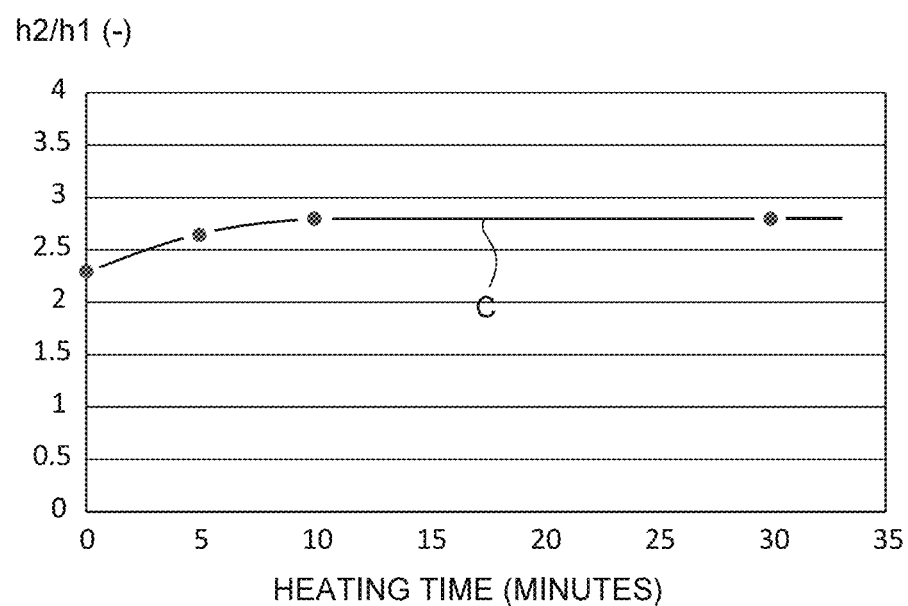
FIG. 15 is a diagram showing the changes in the ratio (h2/h1) of the heights of predetermined peaks (h1 and h2) in an X-ray diffraction chart obtained by an XRD analysis with respect to the time taken by heating at 100° C., for a silver article that had been subjected to a plating treatment and a barrel treatment.

Here, in FIG. 15, with the time taken by annealing at 100° C. being plotted on the axis of abscissa, and the value of h2/h1 of a silver article being plotted on the axis of ordinate, the changes in the Vickers hardness occurred when a silver article that had been subjected to a barrel treatment and a plating treatment was heated for a predetermined time at 100° C., are shown.

From these results, it can be understood that even in a case in which a silver article that has been subjected to a barrel treatment and a plating treatment is heated for 30 minutes or longer at 100° C., the value of h2/h1 can be adjusted to a value of 1.5 or greater.

(2) HV×W2

Figure 5A:
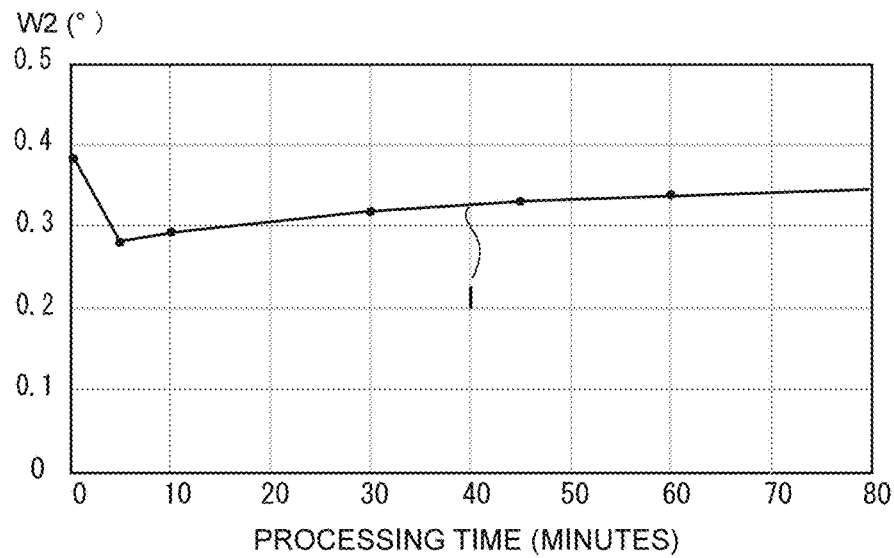
FIGS. 5A to 5C are diagrams showing the changes in the half-value widths (W1 and W2) for predetermined peaks in an X-ray diffraction chart of a silver article and the changes in the ratio thereof (W2/W1) in a case in which the processing time (0, 5, 10, 30, 45, or 60 minutes) by a barrel treatment for a silver article that had not been subjected to a plating treatment and a pressing treatment was changed.
Figure 5B:
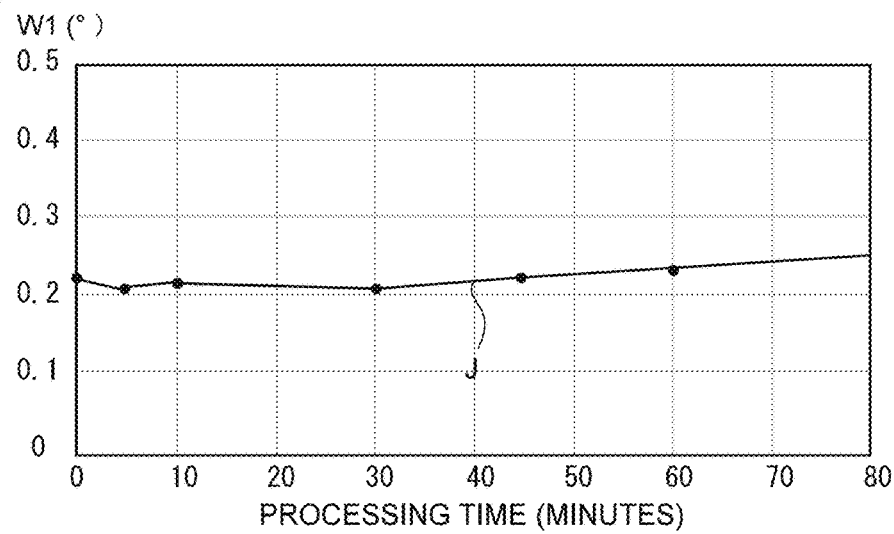
Figure 5C:
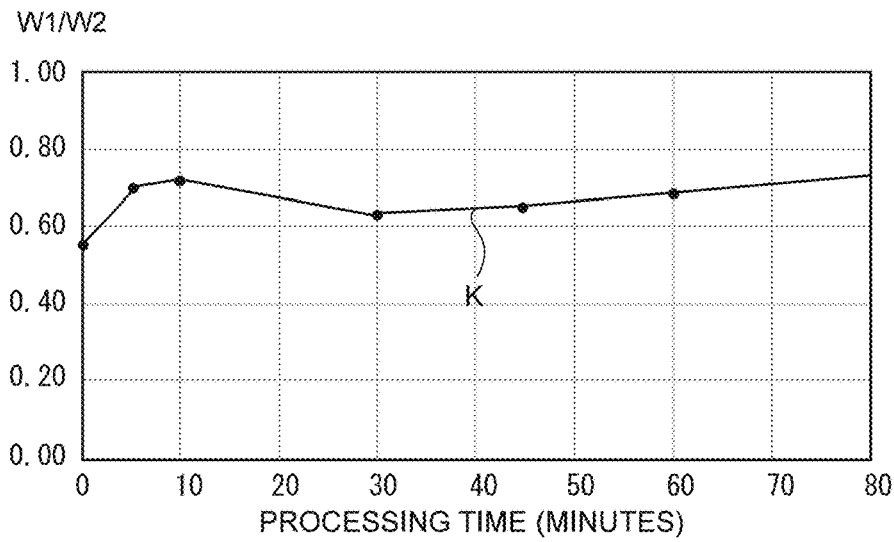
Figure 6A:
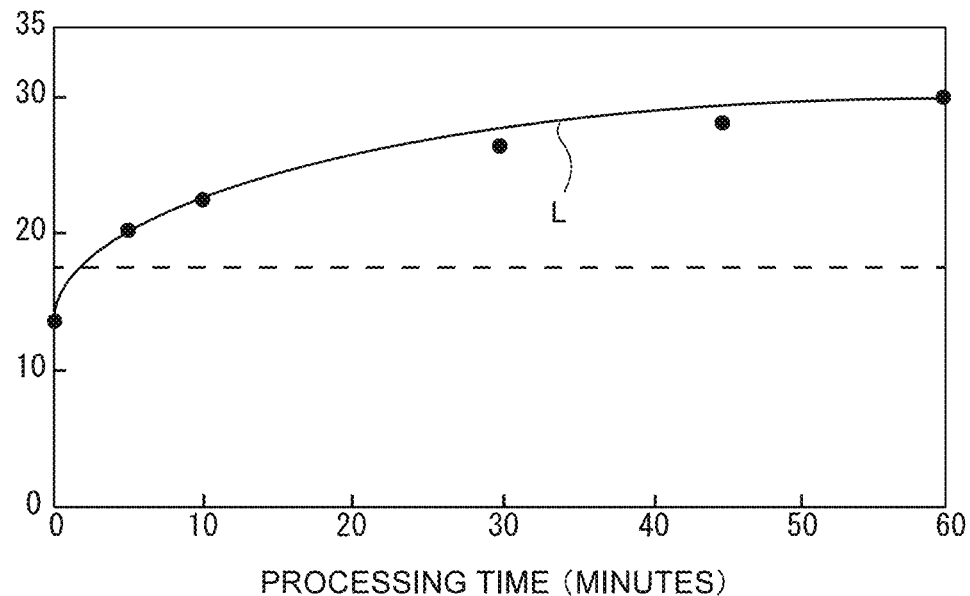
FIG. 6A is a diagram showing the changes in the value of HV×W2 in a case in which the processing time taken by a barrel treatment for a silver article that had not been subjected to a plating treatment and a pressing treatment was changed.

With regard to the silver article of the first embodiment, as shown in FIGS. 5A to 5C, when the silver article does not have a plating layer and is subjected to processing with a barrel treatment only without performing a pressing treatment, when the half-value width of the peak (S1) of 2θ=38°±0.2° in an X-ray diffraction chart obtained by an XRD analysis is designated as W1, and the half-value width of the peak (S2) of 2θ=44°±0.4° is designated as W2, as shown in FIG. 6A, in a case in which the Vickers hardness of the silver article is designated as HV, it is preferable that the value of HV×W2 is adjusted to a value of 18 or greater.

The reason for this is that in a case in which the value of such HV×W2 is adjusted to a value of 18 or greater, a more suitable crystal structure of the silver article can be obtained, and it becomes easier to obtain high Vickers hardness.

Meanwhile, FIGS. 5A to 5C are diagrams showing the relationship between the processing time taken by a barrel treatment and each of W1 and W2, obtained for a silver article that did not have a plating layer and had been subjected to processing with a barrel treatment only without performing a pressing treatment, when the half-value width of the peak (S1) of 2θ=38°±0.2° in an X-ray diffraction chart obtained by an XRD analysis was designated as W1, and the half-value width of the peak (S2) of 2θ=44°±0.4° was designated as W2.

(3) HV×(W1/W2)

Figure 6B:
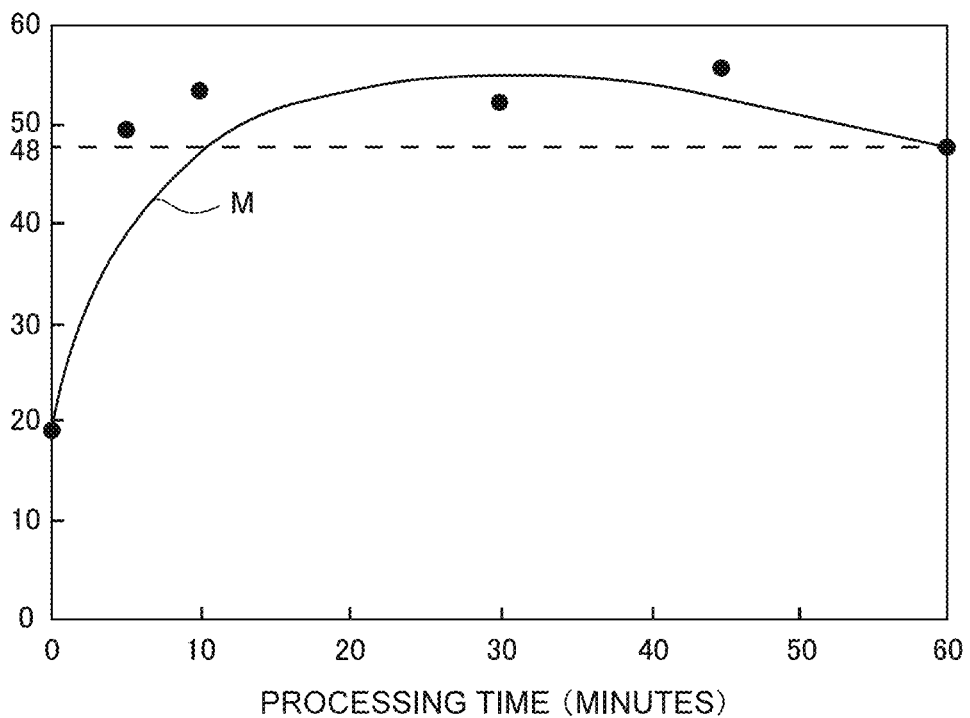
FIG. 6B is a diagram showing the changes in the value of HV×(W1/W2) in a case in which the processing time taken by a barrel treatment for a silver article that had not been subjected to a plating treatment and a pressing treatment was changed.

With regard to the silver article of the first embodiment, as shown in FIG. 6B, when the Vickers hardness of the silver article is designated as HV, the half-value width of the peak of 2θ=38°±0.2° in an X-ray diffraction chart is designated as W1, and the half-value width of the peak of 2θ=44°±0.4° is designated as W2, it is preferable that the value of HV×(W1/W2) is adjusted to 48 or greater.

The reason for this is that in a case in which the value of such HV×(W1/W2) is adjusted to 48 or greater, a more suitable crystal structure of the silver article can be obtained, and it becomes easier to obtain high Vickers hardness.

5. Volume Resistivity

Furthermore, on the occasion of configuring the silver article of the first embodiment, it is preferable that the volume resistivity is adjusted to a value of 2 μOhm·cm or less.

Figure 7:
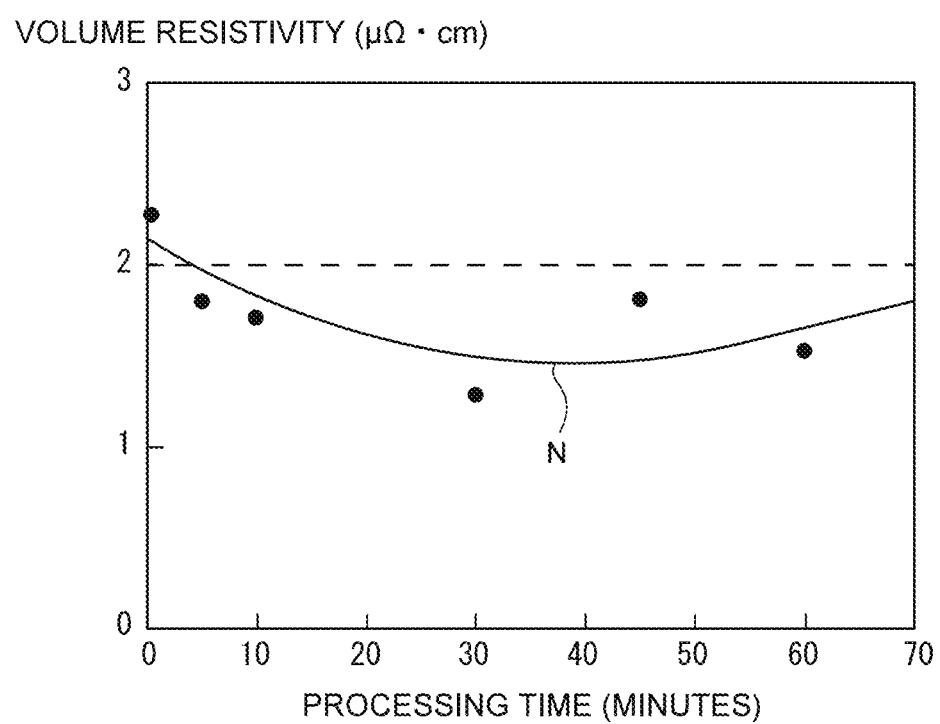
FIG. 7 is a diagram showing the changes in the volume resistivity of a silver article (linear article) in a case in which the processing time taken by a barrel treatment for a silver article that had not been subjected to a plating treatment and a pressing treatment was changed.

The reason for this is that, as shown in FIG. 7, when the volume resistivity is controlled by adjusting the barrel treatment time or the like, the electrical conductivity of the silver article after processing is improved, and the antistatic properties can be further enhanced.

Therefore, from the viewpoint that the electrical conductivity of the silver article is further improved, and the antistatic properties and the impedance properties also become satisfactory, it is more preferable that the volume resistivity of the silver article is adjusted to a value within the range of 0.001 to 1.8 μOhm·cm, and even more preferably to a value within the range of 0.01 to 1.5 μOhm·cm.

Meanwhile, the volume resistivity of a silver article can be measured by a four-terminal method of using a digital voltmeter, by changing the measurement length (for example, four points).

More specifically, a graph is obtained by plotting the resistance measured by a four-terminal method for each measurement length on the axis of ordinate and plotting the measurement length on the axis of abscissa, and the volume resistivity can be calculated from the gradient of a straight line thus obtained.

6. Plating Layer

Figure 8A:
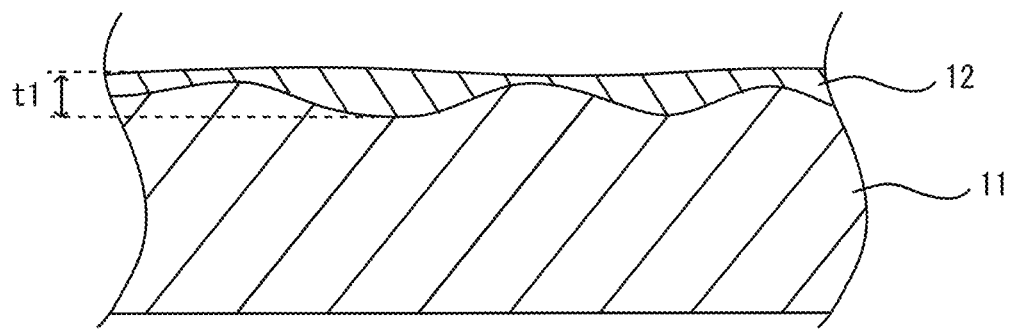
FIGS. 8A to 8C are diagrams provided in order to explain silver articles respectively having a plating layer.
Figure 8B:
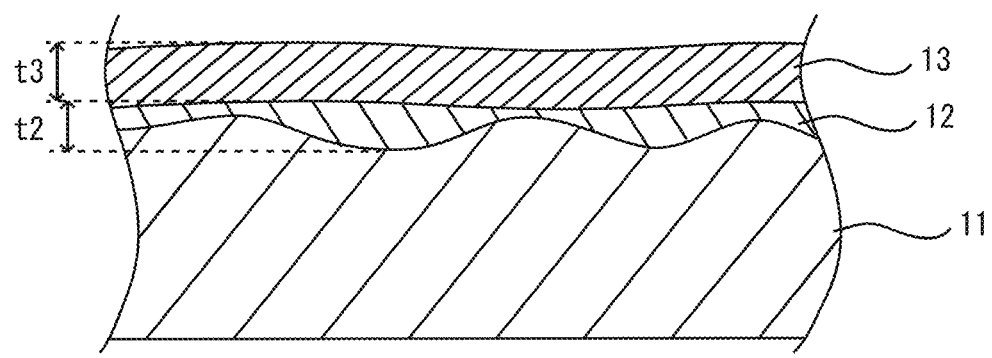
Figure 8C:
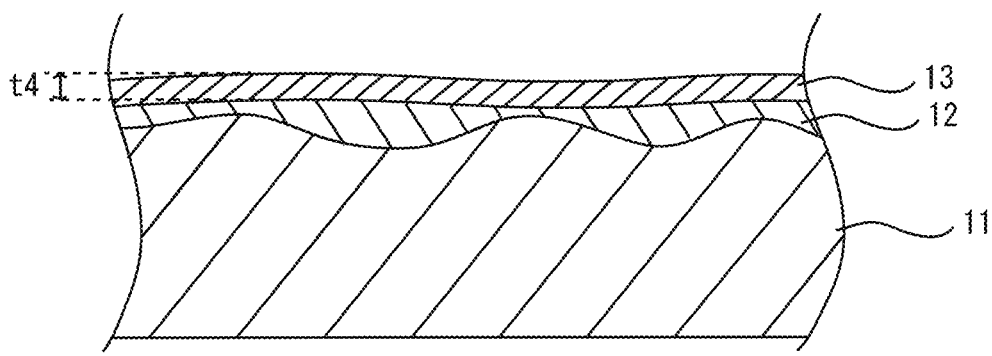

Furthermore, on the occasion of configuring the silver article, as shown in FIGS. 8A to 8C, it is preferable to form a plating layer on the surface.

The reason for this is that, as will be described in detail in a second embodiment, when plating is performed under predetermined conditions, and a plating layer having a predetermined thickness is formed, even higher Vickers hardness can be obtained for a silver article.

Furthermore, it is because since the silver plating fills the surface unevenness of the surface, when the silver plating is subjected to a polishing treatment, a silver article having higher surface smoothness and glossiness can be obtained.

Therefore, the thickness of the plating layer can be determined while taking the increase in the Vickers hardness, the increase in glossiness, and the ease of a polishing treatment or the like into consideration; however, usually, it is preferable to adjust a value within the range of 0.01 to 100 μm.

The reason for this is that a plating layer having such a thickness can be stably formed in a short period of time by a conventional electroplating method or a conventional electroless plating method, and an increase in the Vickers hardness, an increase in glossiness, and the ease of a polishing treatment or the like are obtained.

Therefore, in a case in which a plating layer is formed on a silver article, it is more preferable that the average thickness is adjusted to a value within the range of 0.1 to 80 μm, and even more preferably to a value within the range of 1 to 50 μm.

Furthermore, on the occasion of forming a plating layer on the surface of the silver article, it is preferable that a surface treatment is applied to a silver article that has been subjected to a barrel treatment before a plating layer is formed, using a surface treatment agent including selenium (Se) and antimony (Sb), or any one of them (hereinafter, may be simply referred to as selenium and the like).

It is because when a surface treatment is carried out as such, selenium and the like dissolved into the plating layer, at the same time, the dissolved selenium and the like form a layer that occupies 0.001% to 0.01% by weight as a mass fraction measured by a glow discharge mass analyzer, an ICP emission spectroscopy, or the like, at a position 1 to 5 μm away from the surface.

Generally, it is known that when selenium and the like are included in a silver-plating liquid, the Vickers hardness of the plating layer can be increased to a certain extent; however, higher Vickers hardness can be achieved compared to the case of mixing the same concentration of selenium and the like into the plating liquid.

It is speculated to be because when a silver article that has been subjected to a barrel treatment is subjected to the surface treatment, and a plating layer having high crystal orientation is formed, selenium and the like form a layer without being dispersed, and this is effective for increasing the Vickers hardness.

Therefore, when a surface treatment is carried out by this method, the Vickers hardness in the case of forming a plating layer can be further increased.

7. Surface Characteristics

Furthermore, on the occasion of configuring a silver article, it is preferable that the silver article has a polygonal pattern (may be referred to as hexagonal pattern) on the surface.

Figure 10A:
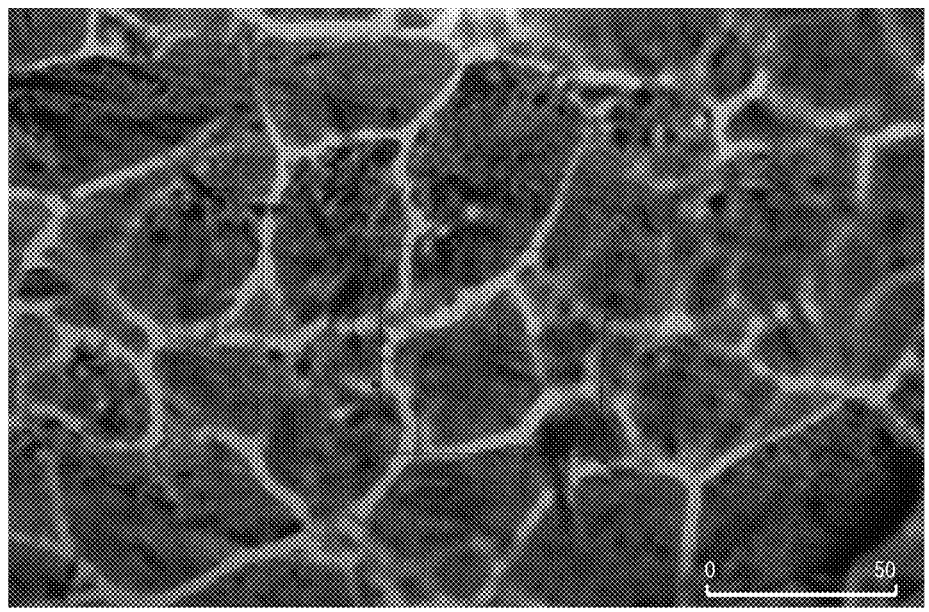
FIG. 10A is a diagram showing an example of a polygonal pattern (hexagonal pattern) recognized on the surface by a barrel treatment (corresponding to Example 1) for a silver article.
Figure 10B:
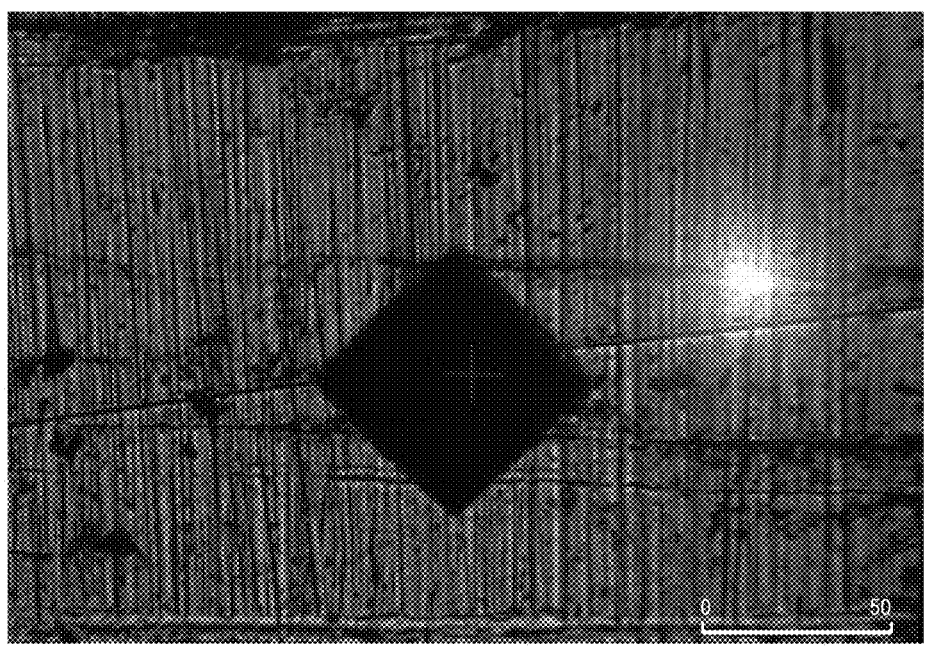
FIG. 10B is a diagram provided in order to explain the surface state before a barrel treatment (corresponding to Comparative Example 1) for a silver article.

That is, as shown in FIG. 10B, it is preferable to convert a simply smooth surface of a silver article into a surface of a silver article, as shown in FIG. 10A, having a polygonal pattern.

The reason for this is that by utilizing such a polygonal pattern as a marker, the degree of barrel polishing and the Vickers hardness of the silver article after processing can be inferred, and furthermore, it can be confirmed that the Vickers hardness is in a predetermined range.

Therefore, it is because it can be visually inferred that the stability over time of a silver article after processing is reliably enhanced, while the hardenability of the silver article after processing is maintained stable.

Incidentally, whether a silver article has a polygonal pattern on the surface can be easily verified using an optical microscope.

8. Others

Conventionally, when silver articles have silver accessories and the like, the sliver accessories and the like are often fixed to the main body of the silver articles using silver solder.

From this point of view, since the amount of use of silver solder with respect to the total amount of such a silver article is very small, it has been made clear that the development of metal allergy, the occurrence of metal corrosion, and the occurrence of discoloration occur to a considerably low extent.

However, from the viewpoint that the occurrence of metal corrosion and the occurrence of discoloration are substantially not observed, it is preferable that the content of metals other than silver, for example, Ni, Cu, Zn, and Al, included in the silver solder is adjusted to 0.1 ppm or less, preferably to 0.01 ppm or less, and even more preferably 0.001 ppm or less.

Furthermore, in a case of fixing a needle-shaped accessory silver member 23 and the like to the main body 21 of a silver article, it is preferable to fix them by a caulking structure obtained by mechanically depressing in which the silver solder is not used.

Figure 11A:
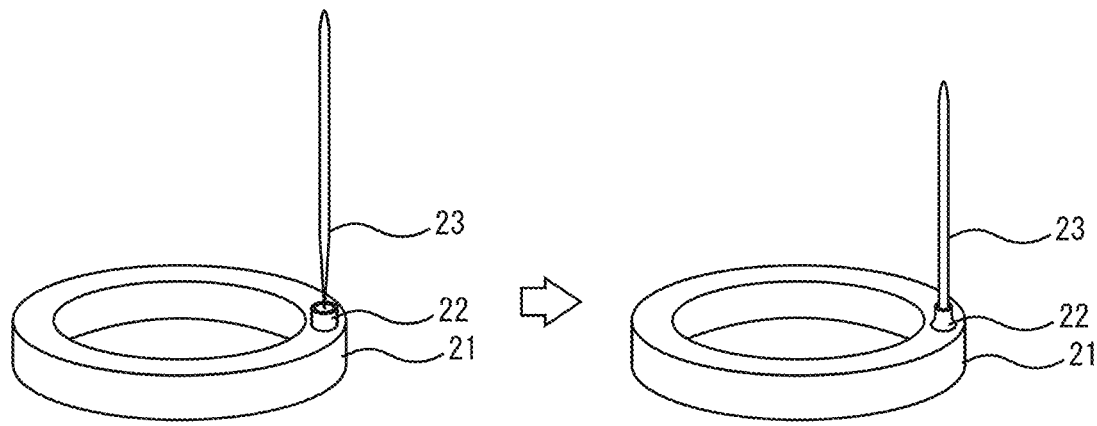
FIGS. 11A and 11B are diagrams provided in order to explain a method for producing a caulking structure.

More specifically, FIG. 11A shows parts of a production process, as an example, it is preferable that a needle-shaped silver member 23 is fixed to a cylindrical hole 22 by a caulking structure.

Furthermore, instead of a needle-shaped silver member 23, it is preferable to use a nail-shaped silver member 26, in which the head portion 26a thereof is spread flat in a direction perpendicular to the axis by means of a pressing machine or the like and is hardened by a barrel treatment.

Figure 11B:
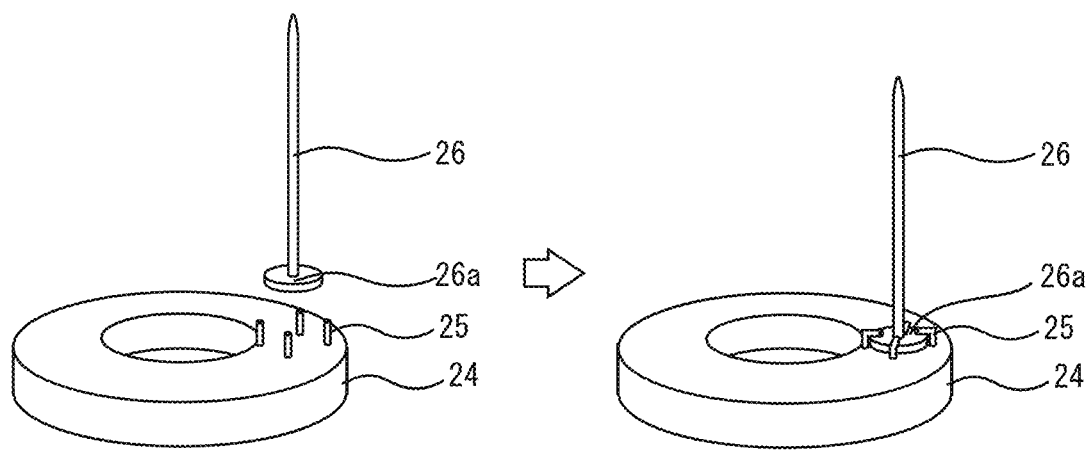

It is because with such a structure, as shown in FIG. 11B, two to eight, and preferably three to six, claws 25 are disposed in advance in a circular form on the main body 24 of a silver article so as to surround the head portion 26a, the claws 25 are tucked in such that the head portion 26a comes at the center of the circle, and thereby the head portion could be easily fixed firmly.

Second Embodiment

A second embodiment is a method for producing a silver article formed from pure silver or a silver alloy having a purity of 99.9% by weight or higher, the method including the following steps (1) and (2):

(1) a step of preparing a silver article having a predetermined shape; and (2) a step of subjecting the silver article having a predetermined shape to work hardening by performing a surface treatment with a magnetic barrel, thereby adjusting the Vickers hardness of the silver article having a predetermined shape to 60 HV or higher, and when the height of the peak of $2\theta=38°\pm0.2°$ in an X-ray diffraction chart obtained by an XRD analysis of the silver article having a predetermined shape is designated as h1, and the height of the peak of $2\theta=44°\pm0.4°$ is designated as h2, adjusting the value of h2/h1 to 0.2 or greater.

1. Step of Preparing Silver Article Having Predetermined Shape

This is a step of preparing pure silver or a silver alloy having a purity of 99.9% by weight or higher, heating to melt the pure silver or the silver alloy, and preparing a silver article having a predetermined shape using a casting mold or the like.

Furthermore, for example, in a case in which there are a flat main body and an accessory such as a fine spring as in the case of a spring terminal, it is preferable that this accessory is bonded to the flat main body that has been produced into a predetermined shape using a casting mold or the like, and thus a silver article having a predetermined shape is prepared.

Incidentally, as described above, it has been made clear that in the case of a silver article that has been subjected to a plating treatment and a pressing treatment, the Vickers hardness acquires a significantly high value through a barrel treatment.

Therefore, in the case of a silver article that has a plating layer and has been subjected to a pressing treatment, since high Vickers hardness can be obtained after a barrel treatment, it is preferable to prepare such a silver article.

2. Hardening Step (1) Barrel Apparatus

Figure 12:
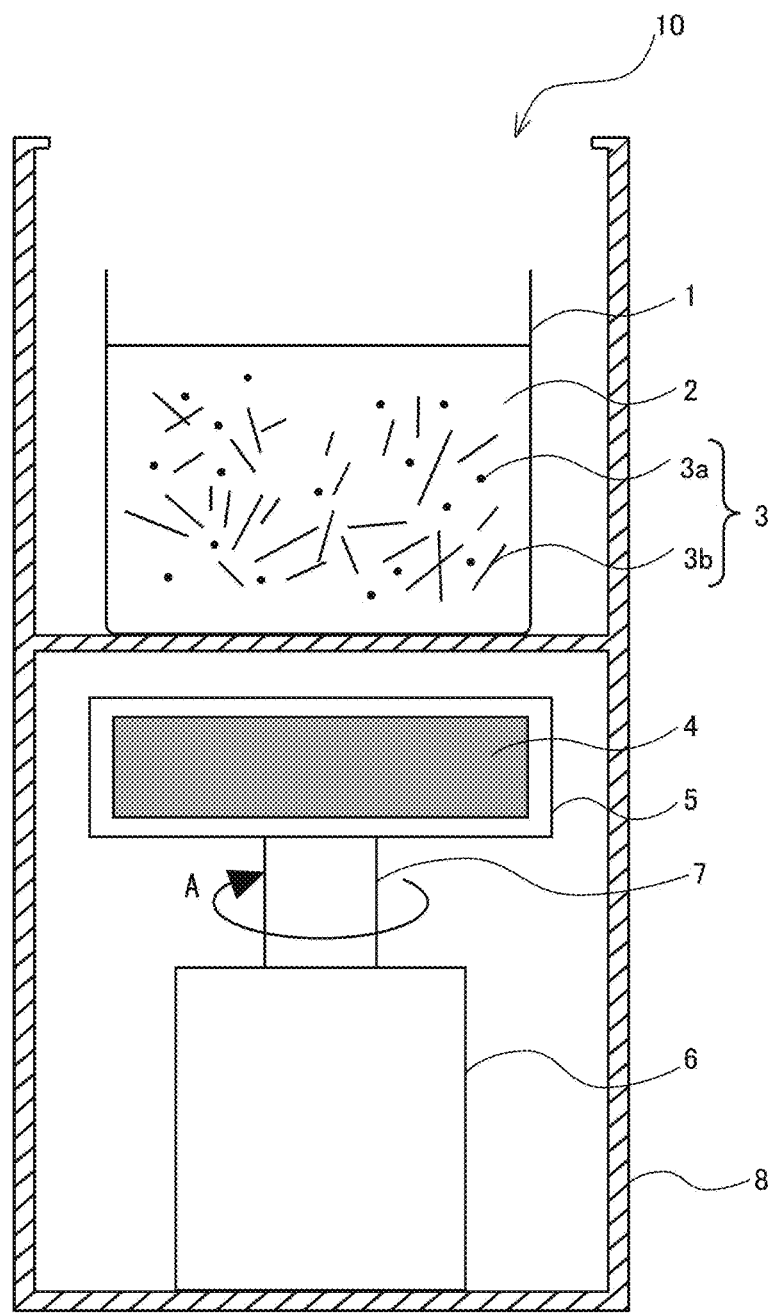
FIG. 12 is an outline diagram provided in order to explain the configuration of a barrel apparatus.

FIG. 12 shows an example of a barrel apparatus 10 for subjecting a silver article having a predetermined shape to surface polishing or the like.

That is, for example, it is preferable that the barrel apparatus 10 is composed of a barrel tank 1 storing a barrel liquid 2 that includes a silver article to be treated, barrel materials 3 (3a, 3b), a rotating magnet 4, a magnet case 5, a motor 6, a rotating shaft 7, and a jacket 8.

As indicated by arrow A in FIG. 12, the rotating shaft 7 connected to the motor 6 is rotated, and the rotating magnet 4 is also rotated along therewith. Thereby, the object to be treated (not shown in the diagram) and the barrel materials 3 (3a, 3b) in the barrel liquid 2 rotationally move while colliding with each other, and thus a barrel treatment as a surface treatment is carried out.

(2) Stirring Treatment Time

The stirring treatment time by the barrel apparatus for the silver article having a predetermined shape can be appropriately modified; however, usually, it is preferable to adjust the stirring treatment time to a value within the range of 1 to 120 minutes.

The reason for this is that when the stirring treatment time is excessively short and is below 1 minute, working hardening may not occur, and it may be difficult to obtain a desired crystal structure.

On the other hand, it is because when the stirring treatment time is excessively long and is longer than 120 minutes, the desired crystal structure that has been once formed may be changed, and again, an effect of work hardening may not be produced.

Therefore, it is more preferable that the stirring treatment time by a barrel apparatus is adjusted to a value within the range of 5 to 60 minutes, and even more preferably to a value within the range of 10 to 30 minutes.

(3) Stirring Speed

The stirring speed by a barrel apparatus for the silver article having a predetermined shape can also be appropriately modified; however, usually, it is preferable to adjust the stirring speed to a value within the range of 1 to 120 rpm in accordance with the speed of rotation.

The reason for this is that when the stirring speed is excessively short and is lower than 1 rpm, the proportion of surface collision between the silver article and the barrel materials is noticeably decreased, work hardening may not occur, and it may be difficult to obtain a desired crystal structure.

On the other hand, it is because when the stirring speed is excessively long and is higher than 120 rpm, the treatment liquid may undergo excessive foaming, or the desired crystal structure that has been once formed may be changed, and again, an effect of work hardening may not be produced.

Therefore, it is more preferable that the stirring speed by a barrel apparatus is adjusted to a value within the range of 10 to 80 rpm, and even more preferably to a value within the range of 20 to 60 rpm.

(4) Barrel Materials

For the surface polishing and the like for the silver article having a predetermined shape, the barrel materials (may also be referred to as media) used in the barrel apparatus can be appropriately changed; however, usually, it is preferable to use spherical objects or needle-shaped objects made of stainless steel (SUS304, 403, or the like).

More specifically, as an example, usually, it is preferable to use spherical barrel materials made of stainless steel having a diameter of 0.1 to 5 mm and needle-shaped barrel materials made of stainless steel having a diameter of 0.5 to 5 mm, having a needle shape with a diameter of 0.005 to 5 mm, mixed at a weight ratio within the range of 10:90 to 90:10, and it is more preferable to use the barrel materials mixed at a weight ratio within the range of 20:80 to 80:20.

Since spherical or needle-shaped barrel materials can each easily increase the collision energy in relation to a magnetic barrel apparatus, it is preferable that the barrel materials are formed of the above-mentioned stainless steel, or a magnetized material obtained by magnetizing stainless steel.

(5) Aqueous Solution

Furthermore, on the occasion of performing a barrel treatment in the barrel apparatus, it is preferable to perform the barrel treatment in a solution state called barrel liquid.

In that case, the barrel liquid may be tap water; however, from the viewpoint of performing the processing treatment safely and reliably, it is more preferable to use distilled water.

Furthermore, for example, it is preferable that the temperature of the barrel liquid is managed to be 20° C. to 50° C. and the pH of the barrel liquid to be between 6 and 8, and it is preferable that the contents of unavoidable copper, iron, and aluminum in the barrel liquid are each adjusted to a value of 0.1 ppm or less, more preferably to a value of 0.05 ppm or less, and even more preferably to a value of 0.01 ppm or less.

3. Plating Treatment Step (1) Type

In a case in which plating is performed on the surface of a silver article having a predetermined shape, regarding the type of the plating, it is preferable that the plating contains silver as a main component; however, in addition to that, gold plating or platinum plating is also preferable.

It is because even with silver plating, gold plating, platinum plating, or the like, an increase in the Vickers hardness, an increase in glossiness, and the ease of a polishing treatment and the like can be obtained.

(2) Plating Treatment Conditions

Furthermore, regarding the plating treatment conditions, any known treatment conditions are employed, and typically, electroless plating, electroplating, and the like are suitable.

In the case of electroless plating, although there is a problem that a relatively long time is required at the time of making a thick film of the resulting plating, a power supply device for forming an electric field in the plating liquid and the like are not required and plating having both less fluctuation in the thickness and a comparatively uniform thickness can be obtained.

On the other hand, in the case of electroplating, since it is similar to electrodeposition coating or the like, although a power supply device for forming an electric field in the plating liquid, and the like are required, advantages that the thickness of the resulting plating can be made uniform, and plating can be attempted in a relatively short time period, can be obtained.

Therefore, regarding the plating conditions for electroplating, it is preferable that after a plating liquid is stored in a plating tank, a silver article is used as one of the electrodes, and usually, the electric current value is set within the range of 10 to 200 mA/cm$^2$, while the current application time is set within the range of 30 seconds to 30 minutes.

Furthermore, it is also preferable to perform composite plating by using electroless plating and electroplating in appropriate combination.

For example, in a first stage, as shown in FIG. 8A, it is preferable that a thin film plating layer having a thickness t1 of 1 μm or less is formed directly and partially on the surface of a silver article by electroless plating 12, and the thin film plating layer is made substantially smooth.

Next, in a second stage, as shown in FIG. 8B to 8C, it is preferable to indirectly form a plating layer having a thickness t3 of above 1 μm, and more preferably 10 μm or more, on the surface of the silver article by performing electroplating 13 on the electroless plating 12 that has been smoothened to thickness t2 by polishing t1 by 1% to 10%.

Then, it is preferable that by subjecting t3 to a polishing treatment by 1% to 10%, an electroplating 13 smoothened to thickness t4 is produced, and the entire surface of the silver article is effectively smoothened.

4. Pressing Treatment Step

During the production process for a silver article, it is also preferable that the silver article is subjected to a pressing treatment in order to obtain a predetermined shape.

The reason for this is that when processing by a pressing treatment is carried out, force is applied even to the inside of the material of the silver article, and even higher Vickers hardness is likely to be obtained.

Furthermore, it is because in the case of performing forming by a pressing treatment, mass production is made easy, and the production cost may be reduced.

Incidentally, in a case in which a pressing treatment and a plating treatment are carried out, it is preferable to perform a pressing treatment first, and then to perform a plating treatment.

It is because even in a case in which the surface is roughened during the pressing treatment, the surface can be made smooth by the plating treatment.

(1) Pressing Treatment Conditions

Incidentally, with regard to the pressing treatment step, any known method can be used, and a roller press, a friction press, and the like can be used as appropriate.

Furthermore, during the pressing treatment step, it is preferable that the pressure to be applied as a linear pressure of a roller is adjusted to a value within the range of 2 to 100 N/cm.

The reason for this is that when such a pressure is below 2 N/cm, a hardness value suitable for a silver article may not be obtained.

On the other hand, it is because when such a pressure is above 100 N/cm, the load on the roll apparatus may become excessively high, or the resulting hardness may become uneven.

Therefore, during the pressing treatment step, it is more preferable that the pressure to be applied as a linear pressure of the roller is adjusted to a value within the range of 10 to 80 N/cm, and even more preferably to a value within the range of 20 to 50 N/cm.

EXAMPLES

Example 1

1. Step of Preparing Silver Article Having Predetermined Shape

Silver having a purity of 100% by weight was prepared, and using a metal vapor deposition apparatus, vacuum deposition onto a tempered glass substrate having a thickness of 0.5 mm formed a silver thin film with a thickness of 1 μm.

2. Barrel Treatment

The thin silver film on the tempered glass substrate thus prepared was subjected to a barrel treatment using a magnetic barrel apparatus, PRITIC M (manufactured by Priority Company), the outline of which is shown in FIG. 8.

That is, 1,000 g of water, 100 g of silver articles having a predetermined shape, 100 g of barrel materials formed from a magnetic material obtained by magnetizing spherical SUS (SUS304) having a diameter of 1 mm, and 1 g of a brightening agent were introduced into a stirring tank inside the barrel apparatus.

Next, the barrel apparatus was operated, and while the stirring tank was rotated in a horizontal direction and a vertical direction at a speed of rotation of 60 rpm, a barrel treatment was carried out for a barrel treatment time of 10 minutes.

3. Evaluation (1) Ratio (h2/h1) of Peak Heights (Evaluation 1)

For the silver articles having a predetermined shape obtained by the barrel treatment, an XRD analysis was carried out.

Next, the height (h1) of the peak of 2θ=38°±0.2° and the height (h2) of the peak of 2θ=44°±0.4° in an X-ray diffraction chart thus obtained were determined, and the ratio (h2/h1) of the peak heights was calculated.

(2) Vickers Hardness (Initial Value) (Evaluation 2)

Only the silver articles having a predetermined shape obtained by the barrel treatment were immediately taken out from the stirring tank, their surfaces were dried with dry cloth, subsequently the Vickers hardness (initial value) based on JIS B2244:2009 (hereinafter, the same) of the surface of each of the silver articles having a predetermined shape was measured at at least three points using a Vickers hardness meter, and the average value thereof was calculated.

⊙ (Very good): 80 HV or higher
○ (Good): 70 HV or higher
Δ (Fair): 60 HV or higher
× (Bad): Lower than 60 HV (3) Vickers hardness (after aging) (Evaluation 3)

Among the silver articles having a predetermined shape obtained by the barrel treatment, samples for which the HV hardness had been measured were stored for 48 hours in an oven that was maintained at 80° C., and then those were taken out.

The silver articles were returned to room temperature, subsequently the Vickers hardness (after aging) of the surface of each of the silver articles having a predetermined shape was measured at at least three points using a Vickers hardness meter, and the average value thereof was calculated.

⊙: 80 HV or higher
○: 70 HV or higher
Δ: 60 HV or higher
×: Lower than 60 HV (4) HV×W2 (Evaluation 4)

For the silver articles having a predetermined shape obtained by the barrel treatment, an XRD analysis was carried out.

Next, the half-value width (W2) of the peak of 2θ=44°±0.4° in an X-ray diffraction chart thus obtained was determined, and with the initial value of the Vickers hardness being designated as HV, the value of HV×W2 was calculated. The value was evaluated according to the following criteria.

⊙: HV×W2≥30.
○: HV×W2≥25.
Δ: HV×W2≥18.
×: HV×W2<18.

(5) HV×(W1/W2) (Evaluation 5)

For the silver articles having a predetermined shape obtained by the barrel treatment, an XRD analysis was carried out.

Next, the half-value width (W1) of the peak of 2θ=38°±0.2° in an X-ray diffraction chart thus obtained was determined, and with the initial value of the Vickers hardness being designated as HV, the value of HV×(W1/W2) was calculated. The value was evaluated according to the following criteria.

⊙: HV×(W1/W2)≥60.
○: HV×(W1/W2)≥48.
Δ: HV×(W1/W2)≥40.
×: HV×(W1/W2)<40.

(6) Volume Resistivity (Evaluation 6)

The silver thin films obtained on the tempered glass substrates were photo-etched to make silver thin films including a plurality of line patterns that had a width of 1.0 mm and were arranged at a space of 0.2 mm.

Next, the resistance value of each of the linear silver thin films was measured at four points at an interval of 1 cm using a four-terminal method, and a graph was produced by plotting the length on the axis of abscissa and the resistance value on the axis of ordinate.

Next, the volume resistivity (μ.Ohm·cm) of the linear silver thin film was measured from the gradient of the characteristic straight line of the graph. The volume resistivity was evaluated according to the following criteria.

⊚: 1.5 μ.Ohm·cm or less.
○: 1.8 μ.Ohm·cm or less.
Δ: 2.0 μ.Ohm·cm or less.
x: Above 2.0 μ.Ohm·cm.

(7) Metal Corrosion Characteristics (Evaluation 7)

Silver thin films as samples were made in the same manner as in the volume resistivity measurement, and a voltage of 25 V was continuously applied between adjacent conductors (0.2 mm space) for 48 hours to visually inspect whether metal corrosion occurred. Thus, the metal corrosion characteristics were evaluated according to the following criteria.

⊚: Occurrence of metal corrosion was not observed.
○: Occurrence of metal corrosion was slightly observed.
Δ: Occurrence of metal corrosion was somewhat observed.
x: Occurrence of metal allergy was remarkably observed.

(8) Discoloration Characteristics (Evaluation 8)

silver thin films as samples were made in the same manner as in the volume resistivity measurement, and the silver thin films were immersed in 200 g of hydrogen sulfide water stored in a 500-liter vessel.

Next, discoloration occurred in the silver thin films in the 500-liter vessel was evaluated according to the following criteria.

⊚: There was no noticeable discoloration even after a lapse of 168 hours.
○: Slight discoloration was observed after a lapse of 168 hours.
Δ: Noticeable discoloration was observed after a lapse of 168 hours.
x: Noticeable discoloration was observed in a time below 168 hours.

Example 2

In Example 2, silver articles were obtained in the same manner as in Example 1, except that the barrel treatment time was lengthened to 30 minutes, and the Vickers hardness and the like were evaluated.

Example 3

In Example 3, silver articles were obtained in the same manner as in Example 1, except that the barrel treatment time was further lengthened to 45 minutes, and the Vickers hardness and the like were evaluated.

Example 4

In Example 4, silver articles were obtained in the same manner as in Example 1, except that the barrel treatment time was further lengthened to 60 minutes, and the Vickers hardness and the like were evaluated.

Example 5

In Example 5, silver articles were obtained in the same manner as in Example 1, except that the barrel treatment time was shortened to 5 minutes, and the Vickers hardness and the like were evaluated.

Example 6

In Example 6, silver articles were obtained in the same manner as in Example 1, except that instead of the silver thin films of Example 1, a silver layer having a thickness of 10 μm was formed, and electroplating formed a silver plating layer having a thickness of 20 μm on the surface of the silver layer, and the electroplating was subjected to a barrel polishing treatment to smoothen the surface, and the Vickers hardness and the like were evaluated.

Example 7

In Example 7, silver articles were obtained in the same manner as in Example 4, except that instead of the silver thin films of Example 1, a silver layer having a thickness of 10 μm was formed, and electroplating was performed to obtain a thickness of 30 μm on the surface of the silver layer, and then the electroplating was subjected to a barrel polishing treatment, and the Vickers hardness and the like were evaluated.

Example 8

In Example 8, silver articles were obtained in the same manner as in Example 4, except that instead of the silver thin films of Example 1, a silver layer having a thickness of 10 μm was formed, and electroplating formed a silver plating layer having a thickness of 10 μm on the surface of the silver layer, and the electroplating was subjected to a barrel polishing treatment to smoothen the surface, and the Vickers hardness and the like were evaluated.

Examples 9 to 16

In Examples 9 to 16, silver articles were obtained in the same manner as in Examples 1 to 8, except that the silver articles of Examples 1 to 8 were each subjected to a pressing treatment before a barrel treatment and the like, using a metal press roll apparatus under the conditions of a linear pressure of 50 N/cm, and the Vickers hardness and the like were evaluated.

As a result, it was verified that for each of the silver articles, high Vickers hardness of 100 HV or higher was obtained while satisfactory results were maintained for the metal corrosion characteristics.

Comparative Example 1

In Comparative Example 1, silver thin films were obtained in the same manner as in Example 1, except that a barrel treatment was not carried out, and the Vickers hardness and the like were evaluated.

Comparative Example 2

In Comparative Example 2, silver articles were obtained in the same manner as in Comparative Example 1, except that electroplating formed a silver plating layer having a thickness of 20 μm, and the Vickers hardness and the like were evaluated.

TABLE 1

|  | Barrel time (min) | Silver plating treatment | Evaluation 1 | Evaluation 2 | Evaluation 3 | Evaluation 4 | Evaluation 5 | Evaluation 6 | Evaluation 7 | Evaluation 8 |
|---|---|---|---|---|---|---|---|---|---|---|
| Example 1 | 10 | None | 0.44 | ○ | △ | △ | ○ | ○ | ⊙ | ⊙ |
| Example 2 | 5 | None | 0.42 | △ | △ | △ | ○ | ○ | ⊙ | ⊙ |
| Example 3 | 30 | None | 0.39 | ⊙ | ⊙ | ○ | ○ | ⊙ | ⊙ | ⊙ |
| Example 4 | 45 | None | 0.81 | ⊙ | ⊙ | ○ | ○ | ○ | ⊙ | ⊙ |
| Example 5 | 60 | None | 0.43 | ○ | ○ | ⊙ | ○ | ○ | ⊙ | ⊙ |
| Example 6 | 10 | Applied 20 μm | 0.63 | ⊙ | ⊙ | ○ | ○ | ⊙ | ⊙ | ⊙ |
| Example 7 | 30 | Applied 30 μm | 0.72 | ⊙ | ⊙ | ○ | ⊙ | ⊙ | ⊙ | ⊙ |
| Example 8 | 45 | Applied 10 μm | 0.75 | ⊙ | ⊙ | ⊙ | ⊙ | ⊙ | ⊙ | ⊙ |
| Comparative Example 1 | 0 | None | 0.18 | X | X | X | X | X | ⊙ | ○ |
| Comparative Example 2 | 0 | Applied 20 μm | 0.19 | △ | △ | X | ○ | X | ⊙ | ○ |

Evaluation 1: h2/h1
Evaluation 2: Vickers hardness (initial value)
Evaluation 3: Vickers hardness (after aging)
Evaluation 4: HV × W2
Evaluation 5: HV(W1/W2)
Evaluation 6: Volume resistivity
Evaluation 7: Metal corrosion characteristics
Evaluation 8: Discoloration characteristics

TABLE 2

|  | Barrel time (min) | Silver plating treatment | Evaluation 1 | Evaluation 2 | Evaluation 3 | Evaluation 4 | Evaluation 5 | Evaluation 6 | Evaluation 7 | Evaluation 8 |
|---|---|---|---|---|---|---|---|---|---|---|
| Example 9 | 10 | None | 0.83 | ⊙ | ⊙ | ⊙ | ○ | ○ | ⊙ | ⊙ |
| Example 10 | 5 | None | 0.81 | ⊙ | ⊙ | ⊙ | ○ | ○ | ⊙ | ⊙ |
| Example 11 | 30 | None | 0.95 | ⊙ | ⊙ | ⊙ | ⊙ | ⊙ | ⊙ | ⊙ |
| Example 12 | 45 | None | 0.91 | ⊙ | ⊙ | ⊙ | ⊙ | ○ | ⊙ | ⊙ |
| Example 13 | 60 | None | 1.02 | ⊙ | ⊙ | ⊙ | ⊙ | ○ | ⊙ | ⊙ |
| Example 14 | 10 | Applied 20 μm | 1.35 | ⊙ | ⊙ | ⊙ | ⊙ | ⊙ | ⊙ | ⊙ |
| Example 15 | 30 | Applied 30 μm | 1.42 | ⊙ | ⊙ | ⊙ | ⊙ | ⊙ | ⊙ | ⊙ |
| Example 16 | 45 | Applied 10 μm | 1.56 | ⊙ | ⊙ | ⊙ | ⊙ | ⊙ | ⊙ | ⊙ |

Evaluation 1: h2/h1
Evaluation 2: Vickers hardness (initial value)
Evaluation 3: Vickers hardness (after aging)
Evaluation 4: HV × W2
Evaluation 5: HV(W1/W2)
Evaluation 6: Volume resistivity
Evaluation 7: Metal corrosion characteristics
Evaluation 8: Discoloration characteristics

INDUSTRIAL APPLICABILITY

According to the silver article and the method for producing a silver article of the present invention, it is possible to provide a silver article in which, despite that pure silver and an ultrahigh-purity silver alloy were used, the Vickers hardness (HV) equal to or higher than a predetermined level compared to pure silver is exhibited by carrying out a barrel treatment and the like, and the development of metal allergy, the occurrence of metal corrosion, and the occurrence of discoloration are induced to a lesser extent; and to provide a method for producing the silver article.

Furthermore, by subjecting a silver article obtained using pure silver and an ultrahigh-purity silver alloy, to a predetermined barrel treatment and then a plating treatment with pure silver, it is possible to provide a silver article in which even higher Vickers hardness (HV) than a predetermined level is exhibited, and the occurrence of metal corrosion and the occurrence of discoloration are induced to a lesser extent; and to provide a method for producing the silver article.

Moreover, when a silver article derived from a silver article that has been subjected to a predetermined barrel treatment is subjected to a pressing treatment and then to a plating treatment, very high Vickers hardness can be obtained.

Therefore, even a person having allergic dermatitis originating from metal allergy can use the silver article safely and hygienically, and it is expected to provide silver articles that can be used with a wide selection of shapes, more economically efficiently.

Therefore, for example, the silver article is expected to be used for a bolt or a fitting for temporarily fixing bones at the normal position after surgery for such as a bone fracture, so that even if the silver article is used for a long time period, the development of metal allergy and the like are induced to a lesser extent, and there is little influence on the user. In addition, safe and hygienic operation can be expected by using the silver article in the hand part of a surgical robot that can perform surgery from a remote control. Then, the use of the silver article in tooth fillings or tooth coverings is expected to reduce the occurrence of metal dissolution due to eating.

Furthermore, according to the silver articles and the method for producing a silver article of the present invention, even if plastic deformation of silver occurred significantly, and the silver article was subjected to aging under predetermined conditions (80° C., 48 hours), a phenomenon in which the crystal structure returns to the original structure, and thereby the Vickers hardness is decreased, was not observed in particular.

In addition, it was found that the volume resistivity of pure silver can be adjusted to a predetermined value or lower by performing a barrel treatment and the like.

Therefore, the silver itself that constitutes the silver article derived from the present invention, is expected to be used also for use applications related to electrically conductive materials with lower heat generation characteristics.

The invention claimed is:

1. A silver article formed from pure silver or a silver alloy having a purity of 99.9% by weight or higher,
    wherein the Vickers hardness of the silver article is adjusted to 60 HV or higher,
    when the height of the peak of $2\theta=38°\pm0.2°$ in an X-ray diffraction chart obtained by an XRD analysis of the silver article is designated as h1, and the height of the peak of $2\theta=44°\pm0.4°$ is designated as h2, the value of h2/h1 is adjusted to 0.2 or greater, and
    the silver article further comprising: a silver plating formed from pure silver or a silver alloy having a purity of 99.9% by weight or higher on the silver article.

2. The silver article according to claim 1, wherein the Vickers hardness of the silver article is adjusted to 100 HV or higher, and
    when the height of the peak of $2\theta=38°\pm0.2°$ in an X-ray diffraction chart obtained by an XRD analysis of the silver article is designated as h1, and the height of the peak of $2\theta=44°\pm0.4°$ is designated as h2, the value of h2/h1 is adjusted to 1.0 or greater.

3. The silver article according to claim 1, wherein when the Vickers hardness of the silver article is designated as HV, and the half-value width of the peak of $2\theta=44°\pm0.4°$ in an X-ray diffraction chart obtained by an XRD analysis of the silver article is designated as W2, the value of HV×W2 is adjusted to a value of 18 or greater.

4. The silver article according to claim 1, wherein when the Vickers hardness of the silver article is designated as HV, the half-value width of the peak of $2\theta=38°\pm0.2°$ in an X-ray diffraction chart obtained by an XRD analysis of the silver article is designated as W2, and the half-value width of the peak of $2\theta=44°\pm0.4°$ is designated as W2, the value of HV×(W1/W2) is adjusted to 48 or greater.

5. The silver article according to claim 1, wherein the volume resistivity is 2 μ.Ohm·cm or less.

6. The silver article according to claim 1, wherein the silver article is any one of an electrode member, a heat transfer article, a circuit member, a solder alternative material, a medical instrument, a reflective material, an accessory, a decoration, silver clay, and silverware.

* * * * *